United States Patent
He et al.

(10) Patent No.: US 12,492,266 B2
(45) Date of Patent: Dec. 9, 2025

(54) METHOD FOR OPTIMIZING VIRUS MEMBRANE FUSION INHIBITOR, BROAD-SPECTRUM ANTI-CORONAVIRUS LIPOPEPTIDE AND USE THEREOF

(71) Applicant: YOUCARE PHARMACEUTICAL GROUP CO., LTD., Beijing (CN)

(72) Inventors: Yuxian He, Beijing (CN); Yuanmei Zhu, Beijing (CN); Huihui Chong, Beijing (CN); Nian Liu, Beijing (CN)

(73) Assignee: YOUCARE PHARMACEUTICAL GROUP CO., LTD., Beijing (CN)

( * ) Notice: Subject to any disclaimer, the term of this patent is extended or adjusted under 35 U.S.C. 154(b) by 0 days.

(21) Appl. No.: 18/720,420

(22) PCT Filed: May 19, 2022

(86) PCT No.: PCT/CN2022/094001
§ 371 (c)(1),
(2) Date: Jun. 14, 2024

(87) PCT Pub. No.: WO2023/155318
PCT Pub. Date: Aug. 24, 2023

(65) Prior Publication Data
US 2024/0425618 A1    Dec. 26, 2024

(30) Foreign Application Priority Data
Feb. 21, 2022   (CN) .......................... 202210156260.2

(51) Int. Cl.
C07K 19/00    (2006.01)
(52) U.S. Cl.
CPC .................................... C07K 19/00 (2013.01)
(58) Field of Classification Search
CPC ..................................................... C07K 19/00
See application file for complete search history.

(56) References Cited

U.S. PATENT DOCUMENTS 7,151,163 B2 * 12/2006 Erickson ................. A61P 11/00
424/221.1
2002/0028771 A1    3/2002 Curran

FOREIGN PATENT DOCUMENTS

CA        3010779 A1    9/2017
CA        3108610 A1    11/2019
(Continued)

OTHER PUBLICATIONS

Machine Translation of CN111643656A, translated by EPO on Oct. 10, 2024, 34 pages (Year: 2024).*

(Continued)

*Primary Examiner* — Randall L Beane
(74) *Attorney, Agent, or Firm* — Squire Patton Boggs (US) LLP

(57) ABSTRACT

The present disclosure relates to a method for optimizing a virus membrane fusion inhibitor, a broad-spectrum anti-coronavirus lipopeptide and use thereof. The present disclosure provides compounds or pharmaceutically acceptable salts thereof or derivatives thereof, wherein the compounds are shown in formula (I) or formula (II), $X_1$ is an amino-terminal protecting group; $X_2$ is a polypeptide with an amino acid sequence of $(EAAAK)_n$ or $A[(EAAAK)_n]A$; $X_3$ is lysine or cysteine or 2,3-diaminopropionic acid or ornithine or 2,4-diaminobutyric acid or 2,7-diaminoheptonic acid; $X_4$ is a lipophilic compound group modified on $X_3$ or $X_4$ is a lipophilic compound group modified on K in $X_2$; $X_5$ is a carboxyl-terminal protecting group. The compounds of the present disclosure have a stable property, are highly efficient and broad-spectrum novel coronavirus membrane fusion inhibitors, and used in preparation of pharmaceutical compositions for preventing and treating a disease caused by a coronavirus. The pharmaceutical compositions are used for preventing and treating the diseases caused by the coronavirus.

(Continued)

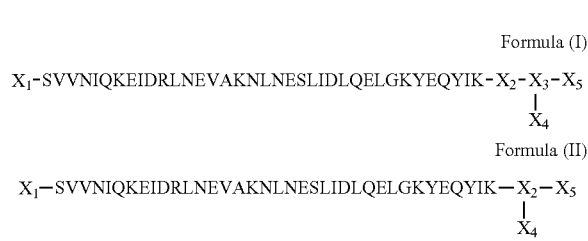

2 Claims, 6 Drawing Sheets

Specification includes a Sequence Listing.

(56) References Cited

FOREIGN PATENT DOCUMENTS

| CN | 111643656 A | * | 9/2020 | ......... A61K 38/1709 |
|---|---|---|---|---|
| CN | 111675752 A | | 9/2020 | |
| CN | 112625094 A | | 4/2021 | |
| CN | 113480619 A | | 10/2021 | |
| CN | 113980124 A | | 1/2022 | |
| WO | 2019211630 A2 | | 11/2019 | |
| WO | 2020249944 A1 | | 12/2020 | |

OTHER PUBLICATIONS

Zhu et al., Design of Potent Membrane Fusion Inhibitors against SARS-CoV-2, an Emerging Coronavirus with High Fusogenic Activity. J Virol. Jul. 1, 2020;94(14):e00635-20. doi: 10.1128/JVI.00635-20. PMID: 32376627; PMCID: PMC7343218 (Year: 2020).*
Zhu et al., SARS-CoV-2-derived fusion inhibitor lipopeptides exhibit highly potent and broad-spectrum activity against divergent human coronaviruses. Sig Transduct Target Ther 6, 294 (2021). https://doi.org/10.1038/s41392-021-00698-x (published online Aug. 3, 2021) (Year: 2021).*
Chen et al., Fusion protein linkers: property, design and functionality. Adv Drug Deliv Rev. Oct. 2013;65(10):1357-69. doi: 10.1016/j.addr.2012.09.039. Epub Sep. 29, 2012. PMID: 23026637; PMCID: PMC3726540 (Year: 2012).*
Definition of "derivative", NIH National Cancer Institute, NCI Dictionary of Cancer Terms, 1 page, also available at www.cancer.gov/publications/dictionaries/cancer-terms/def/derivative (last visited Jan. 6, 2025) (Year: 2025).*
Human-assisted Machine Translation of CN111643656A, Translated by STIC-Translations on Oct. 11, 2024, 38 pages (Year: 2024).*
Xia et al., Inhibition of SARS-CoV-2 (previously 2019-nCoV) infection by a highly potent pan-coronavirus fusion inhibitor targeting its spike protein that harbors a high capacity to mediate membrane fusion. Cell Res 30, 343-355 (2020). https://doi.org/10.1038/s41422-020-0305-x; (Year: 2020).*
Definition of "Domain", NIH, National Cancer Institute, 1 page, https://www.cancer.gov/publications/dictionaries/genetics-dictionary/def/domain (last visited Apr. 29, 2025); hereafter "Definition". (Year: 2025).*
Arai, "Design of Helical Linkers for Fusion Proteins and Protein-Based Nanostructures", Methods Enzymol, vol. {0} vol. 647, Nov. 18, 2020 (Nov. 18, 2020).
De Vries, "Intranasal Fusion Inhibitory Lipopeptide Prevents Direct-Contact SARS-CoV-2 Transmission in Ferrets", Science, vol. {0} vol. 371, Feb. 17, 2020 (Feb. 17, 2020).
Ding, "Enfuvirtide (T20)-Based Lipopeptide Is a Potent HIV-1 Cell Fusion Inhibitor: Implications for Viral Entry and Inhibition." Journal of Virology, vol. 91, Issue 18, pp. 1-20, https://doi.org/10.1128/jvi.00831-17, Sep. 2017.
Li, "Secondary Structures of the Transmembrane Domain of SARS-CoV-2 Spike Protein in Detergent Micelles." Int J Mol Sci.; 23(3):1040. doi: 10.3390/ijms23031040, Jan. 18, 2022.
Xia, "Inhibition of SARS-CoV-2 (Previously 2019-nCoV) Infection by a Highly Potent Pan-Coronavirus Fusion Inhibitor Targeting Its Spike Protein that Harbors a High Capacity to Mediate Membrane Fusion", Cell Research, Mar. 30, 2020 (Mar. 30, 2020).
Xu, "Design, evaluation and mechanism study of a long-acting HIV fusion inhibitor." PhD Thesis, Fudan University, Apr. 10, 2014.
Xue, "Efficient treatment and pre-exposure prophylaxis in rhesus macaques by an HIV fusion-inhibitory lipopeptide." Cell. Jan. 6, 2022;185(1):131-144.e18. doi: 10.1016/j.cell.2021.11.032.
Yu, "Pan-Coronavirus Fusion Inhibitors Possess Potent Inhibitory Activity against HIV-1, HIV-2, and Simian Immunodeficiency Virus", Emerging Microbes & Infections, vol. {0} vol. 10, Apr. 29, 2021 (Apr. 29, 2021).
Yu, "Structure-Based Design and Characterization of Novel Fusion-Inhibitory Lipopeptides against SARS-CoV-2 and Emerging Variants", Emerging Microbes & Infections, vol. {0} vol. 10, Jun. 18, 2021 (Jun. 18, 2021).
Zhou, "A Highly Potent and Stable Pan-Coronavirus Fusion Inhibitor as a Candidate Prophylactic and Therapeutic for COVID-19 and Other Coronavirus Diseases", Acta Pharmaceutica Sinica B, vol. {0} vol. 12, Aug. 2, 2020 (Aug. 2, 2020).
Zhu, "Design of Potent Membrane Fusion Inhibitors against SARS-CoV-2, an Emerging Coronavirus with High Fusogenic Activity", Journal of Virology, vol. {0} vol. 94, Jun. 1, 2020 (Jun. 1, 2020).
Zhu, "SARS-CoV-2-Derived Fusion Inhibitor Lipopeptides Exhibit Highly Potent and Broad-Spectrum Activity against Divergent Human Coronaviruses", Signal Transduction and Targeted Therapy, Aug. 3, 2021 (Aug. 3, 2021).
International Search Report dated Nov. 11, 2022, PCT Patent Application No. PCT/CN2022/094001.
First Office Action dated Jul. 19, 2022, Chinese Patent Application No. CN 2022105439471.
European Search Report dated Mar. 7, 2025, EP Patent Application No. 22926629.1.
Canadian Office Action dated Jun. 20, 2024, CA Patent Application No. 3,240,348.
Singapore Office Action and Written Opinion dated Jan. 14, 2025, Singapore Patent Application No. 11202404061U.
Korean Office Action dated Oct. 7, 2024, Korean Patent Application No. 10-2024-7028858, with English Translation.
Russian Office Action dated Mar. 17, 2025, Russian Patent Application No. 2024127859.
Japanese Office Action dated Apr. 8, 2025, Japanese Patent Application No. 2024-508915.
Chen, et al., "Fusion Protein Linkers: Property, Design and Funcitonality," Adv Drug Deliv Rev. Oct. 15, 2013; 65 (10); 1357-1369. doi: 10.1016/j.addr.2012.09.039.

* cited by examiner

| SARS-CoV-2 | IC$_{50}$ (nM) | | | |
|---|---|---|---|---|
| | IPB24 | IPB28 | IPB29 | IPB30 |
| WT | 5.51 ± 0.27 | 6.91 ± 0.21 | 0.57 ± 0.004 | 4.19 ± 0.05 |
| D614G | 6.17 ± 0.02 | 7.26 ± 0.05 | 0.77 ± 0.05 | 4.57 ± 0.18 |
| K417N | 6.04 ± 0.01 | 6.49 ± 0.09 | 1.10 ± 0.06 | 4.07 ± 0.02 |
| E484K | 5.61 ± 0.17 | 8.46 ± 0.39 | 0.97 ± 0.03 | 3.91 ± 0.06 |
| N501Y | 5.24 ± 0.54 | 6.11 ± 0.19 | 1.25 ± 0.01 | 3.50 ± 0.26 |
| P681R | 4.31 ± 0.22 | 4.54 ± 0.32 | 0.79 ± 0.01 | 3.93 ± 0.15 |
| N501Y/69-70 | 4.96 ± 0.10 | 6.12 ± 0.07 | 1.20 ± 0.13 | 5.56 ± 0.12 |
| N501Y/P681H | 3.84 ± 0.13 | 5.68 ± 0.40 | 1.01 ± 0.10 | 3.84 ± 0.19 |
| Alpha | 5.94 ± 0.10 | 6.12 ± 0.21 | 1.13 ± 0.04 | 3.11 ± 0.02 |
| Beta | 5.65 ± 0.01 | 5.75 ± 0.16 | 0.89 ± 0.00 | 2.41 ± 0.27 |
| Gamma | 6.41 ± 0.09 | 5.46 ± 0.02 | 0.53 ± 0.05 | 2.87 ± 0.23 |
| Delta | 4.94 ± 0.03 | 6.30 ± 0.47 | 0.79 ± 0.02 | 3.57 ± 0.28 |
| Lamda | 6.57 ± 0.01 | 7.86 ± 0.35 | 1.14 ± 0.02 | 4.81 ± 0.09 |
| Omicron | 4.51 ± 0.15 | 4.51 ± 0.19 | 0.47 ± 0.03 | 1.76 ± 0.09 |

FIG. 4

| SARS-CoV-2 | IC$_{50}$ (nM) | | | |
|---|---|---|---|---|
| | IPB24 | IPB28 | IPB29 | IPB30 |
| WT | 2.43 ± 0.07 | 2.88 ± 0.05 | 0.53 ± 0.00 | 2.77 ± 0.12 |
| D614G | 3.15 ± 0.06 | 4.23 ± 0.17 | 0.74 ± 0.07 | 2.47 ± 0.10 |
| K417N | 3.93 ± 0.84 | 5.33 ± 0.43 | 1.30 ± 0.25 | 1.78 ± 0.27 |
| E484K | 4.84 ± 0.13 | 5.98 ± 0.04 | 0.99 ± 0.16 | 2.40 ± 0.48 |
| N501Y | 3.47 ± 0.57 | 5.03 ± 0.03 | 0.97 ± 0.07 | 2.12 ± 0.03 |
| P681R | 2.09 ± 0.09 | 3.71 ± 0.19 | 0.75 ± 0.08 | 1.95 ± 0.17 |
| N501Y/69-70 | 4.50 ± 0.47 | 5.34 ± 0.54 | 1.03 ± 0.01 | 3.37 ± 0.06 |
| N501Y/P681H | 2.48 ± 0.11 | 4.55 ± 0.31 | 0.83 ± 0.06 | 2.41 ± 0.64 |
| Alpha | 5.42 ± 0.30 | 4.29 ± 0.39 | 0.73 ± 0.10 | 2.05 ± 0.07 |
| Beta | 3.29 ± 0.757 | 4.21 ± 0.26 | 0.65 ± 0.16 | 1.90 ± 0.10 |
| Gamma | 3.95 ± 0.72 | 3.89 ± 0.28 | 0.57 ± 0.002 | 2.31 ± 0.47 |
| Delta | 3.46 ± 0.13 | 4.34 ± 0.23 | 0.56 ± 0.05 | 2.17 ± 0.01 |
| Lamda | 4.10 ± 0.89 | 5.36 ± 1.37 | 0.96 ± 0.10 | 3.45 ± 0.18 |
| Omicron | 2.56 ± 0.47 | 2.46 ± 0.24 | 0.46 ± 0.02 | 1.46 ± 0.09 |

FIG. 5

| Coronavirus | Target cell | IC$_{50}$ (nM) | | | |
|---|---|---|---|---|---|
| | | IPB24 | IPB28 | IPB29 | IPB30 |
| bat RaTG13 | 293T/ACE2 | 5.09 ± 1.37 | 4.94 ± 1.97 | 1.23 ± 0.56 | 2.33 ± 0.79 |
| PCoV-GD | 293T/ACE2 | 7.82 ± 0.38 | 7.10 ± 0.03 | 1.35 ± 0.11 | 7.30 ± 0.62 |
| PCoV-GX | 293T/ACE2 | 5.83 ± 0.28 | 5.15 ± 1.04 | 1.25 ± 0.28 | 8.78 ± 1.28 |
| SARS-CoV | Huh-7 | 18.81 ± 1.27 | 18.89 ± 3.98 | 6.17 ± 0.57 | 65.29 ± 0.44 |
| MERS-CoV | Huh-7 | 70.36 ± 7.96 | 140.36 ± 49.23 | 100.32 ± 17.70 | 719.73 ± 30.50 |
| HCoV-NL63 | Huh-7 | 186.97 ± 49.45 | 304.93 ± 38.94 | 80.78 ± 8.81 | 712.77 ± 17.40 |
| HCoV-229E | Huh-7 | 287.97 ± 54.82 | 748.35 ± 19.63 | 309.30 ± 12.63 | 2054.17 ± 108.13 |

FIG. 6

METHOD FOR OPTIMIZING VIRUS MEMBRANE FUSION INHIBITOR, BROAD-SPECTRUM ANTI-CORONAVIRUS LIPOPEPTIDE AND USE THEREOF

CROSS-REFERENCE

The present application is a national phase filing under 35 U.S.C. § 371 of International Application No. PCT/CN2022/094001, filed on May 19, 2022, which claims the benefit of Chinese Patent Application No. 202210156260.2, filed on Feb. 21, 2022, both applications are incorporated herein by reference in their entirety.

REFERENCE TO AN ELECTRONIC SEQUENCE LISTING

The contents of the electronic sequence listing (MTPIUS220165_Amended SeqList.txt; Size: 2,683 bytes; and Date of Creation: Apr. 11, 2025) are herein incorporated by reference in their entireties.

TECHNICAL FIELD

The present disclosure relates to a method for optimizing a virus membrane fusion inhibitor, a broad-spectrum anti-coronavirus lipopeptide and use thereof.

BACKGROUND ART

Membrane fusion is an extremely important biological phenomenon, and physiological processes such as formation of fertilized eggs and intracellular vesicle transport are achieved by the membrane fusion. Many viruses seriously harming human health also infect host cells through the membrane fusion, such as human immunodeficiency virus (HIV), influenza virus, hepatitis virus, Ebola virus, Zika virus, severe acute respiratory syndrome (SARS) coronavirus, middle east respiratory syndrome (MERS) coronavirus, and the novel coronavirus (SARS-COV-2) currently widely spreading in human. Virus membrane fusion is mediated by a fusion protein located on the surface of a virus particle, such as a gp41 subunit of an envelope protein of HIV and an S2 subunit of a coronavirus spike S protein. In the sequence structure, the fusion protein usually contains important functional regions such as a fusion peptide (FP), a heptad repeat domain 1 (HR1), a heptad repeat domain 2 (HR2), and a transmembrane domain (TM) in sequence. During a viral membrane fusion process, the fusion protein usually undergoes a drastic conformational change. Firstly, FP is exposed and inserted into a target cell membrane, and then HR1 forms a trimer helix and HR2 reversely folds in a groove formed by an HR1 trimer, which leads to the formation of a typical six-helix bundle (6-HB) structure, thereby drawing the virus membrane and cell membrane close, and enabling genetic materials of a virus to enter a target cell through a fusion hole. It is found that polypeptides derived from the HR1 and HR2 regions of many viruses can act as inhibitors of virus membrane fusion by competitively binding to the fusion protein in a pre-fusion state, thereby blocking the formation of the 6-HB structure. At present, T20 (enfuvirtide), a drug for treating HIV, is the only virus membrane fusion inhibitor approved by the US FDA for clinical use. But the development of antiviral drugs aiming at the target is always highlighted. For improving the half-life and antiviral activity of the polypeptides, lipopeptides modified based on lipid compounds such as fatty acids and cholesterol, etc. are a major direction of development for virus membrane fusion inhibitors in recent years (see reference 1).

Coronaviruses (CoV) are enveloped positive-sense, single-stranded RNA viruses with four genera, α, β, γ, and δ. The CoV known to infect human now includes HCoV-229E and HCo V-NL63 of the a genus and HCoV-OC43, CoV-HKU1, SARS-COV, MERS-COV, and SARS-COV-2 of the β genus. HCoV-229E, HCoV-NL63, HCoV-OC43, and CoV—HKU1 are common epidemic pathogens that typically cause common cold symptoms, account for about 10% to 30% of upper respiratory infections in adults, but they can still cause serious and even fatal diseases in children, the elderly, and immunocompromised patients. SARS-COV, MERS-COV, and SARS-COV-2 belong to highly pathogenic pathogens, which causes severe lung diseases and have high mortality. SARS-COV-2 has a sequence homology of 79.5% with SARS-COV and 96% with bat coronavirus SL-CoV-RaTG13 respectively, and uses the same cell receptor (ACE2). But SARS-COV-2 has a stronger transmission capability than that of SARS-COV. By the end of January 2022, nearly 0.36 billion novel coronavirus (COVID-19) cases were reported cumulatively worldwide with over 5.6 million patients died. SARS-COV-2 continuously produces variants of concern (VOC) during prevalence, such as Alpha, Beta, Gamma, Delta, Omicron, and other virus strains, which often causes reduced activity or even no activity of vaccines and drugs. Therefore, there is a need to develop highly effective and broad-spectrum coronavirus inhibitors.

That is to say, there is a need to develop highly efficient and broad-spectrum coronavirus inhibitors in the field. The inhibitors can inhibit a variety of types of coronaviruses, including different mutant coronaviruses.

SUMMARY OF THE INVENTION

The research team of the disclosure is dedicated to research and development of virus membrane fusion inhibitors, and has designed some broad-spectrum coronavirus membrane fusion inhibitors based on lipopeptides. The inhibitors have strong inhibitory activities on SARS-COV-2 and mutant strains thereof (see references 2-5).

In designing lipopeptide-based virus membrane fusion inhibitors, it often needs to incorporate a linker between a polypeptide sequence and a lipid group (e.g., fatty acids and cholesterol, etc.) to act as a linking arm. An expected binding site for the lipid group is a virus or cell membrane, while the polypeptide is enriched in a target region. Therefore, the lipid group and polypeptide have different binding sites. Since the polypeptide tends to form a stable secondary structure and has a relatively strong structural rigidity, a flexible linker is usually selected and used for linking the polypeptide and lipid group, such that the polypeptide and lipid group can form suitable conformations respectively and are bound to respective binding sites. Meanwhile, when the polypeptide and lipid group fully play respective effects, mutual effects caused by steric hindrance, etc. should be avoided. Common flexible linkers are combinations of glycine (G) and serine(S), such as [GGGGS (SEQ ID NO: 7)]$_n$ or [GSGSG (SEQ ID NO: 5)]$_n$, etc. By changing size of n, the distance between domains can be enlarged or reduced. Another common flexible linker is a small molecule polyethylene glycol (PEG)$_n$, where n is mostly between 2 and 24. Currently, the reported lipopeptides as coronavirus membrane fusion inhibitors also all use flexible linkers, such as PEG$_8$ as a linker for IPB02V1-IPB02V5 (see reference 2), PEG$_4$, PEG$_5$, PEG$_6$, and PEG$_8$ for IPB24-IPB27 respectively (see reference 4), GSG for EKL1C (see reference 6), GSGSG (SEQ ID NO: 5) and PEG$_4$ in series for EK1C4 (see reference 7), and PEG$_4$ for [SARSHRC-PEG$_4$]$_2$-chol (see reference 8). A common rigid linker for preparing a fusion protein has an [EAAAK(SEQ ID NO: 4)]$_n$ sequence capable of forming an α-helix, has internal hydrogen bonds and a closely-linked peptide chain backbone, and is rigid and stable. Another type of a rigid linker has a Pro-rich sequence (XP)$_n$, where X may designate any amino acid, preferably alanine, lysine or glutamic acid; and the sequence (XP)$_n$ does not have a helix structure, but proline therein can increase rigidity of a skeleton and effectively isolate structural domains.

There are no precedents that use a rigid linker in the preparation of lipopeptide inhibitors of virus membrane fusion at present. The present disclosure creatively uses the sequence of the rigid linker EAAAK(SEQ ID NO: 4) to prepare a broad-spectrum coronavirus membrane fusion inhibitor lipopeptide, endows a polypeptide with a remarkable helical structure, and remarkably improves the antiviral activity and stability of the inhibitor.

The present disclosure originally provides a method for optimizing virus membrane fusion inhibitors, and broad-spectrum anti-coronavirus lipopeptides and use thereof.

The present disclosure discovers for the first time: compounds IPB29 and IPB30 having formula I with a rigid linker EAAAK(SEQ ID NO: 4), especially IPB29, has at least a 70-fold increase in the inhibitory activity against novel coronaviruses compared with compounds without the linker, and has an approximately 8-fold increase in the inhibitory activity compared with compounds with a flexible linker, such as PEG or GSGSG (SEQ ID NO: 5).

Meanwhile, the inventors found that the reason for the improved activity of lipopeptide IPB29 is that the rigid linker EAAAK(SEQ ID NO: 4) significantly increases the helix content of the lipopeptide and improves the stability. Besides, the lipopeptide IPB29 can inhibit many different types of novel coronaviruses, including but not limited to SARS-COV-2 and various mutant strains thereof, SARS-COV, MERS—COV, HCOV-229E, HCoV-OC43, HCoV-NL63 and other coronaviruses.

Particularly, the present disclosure uses a rigid linker EAAAK(SEQ ID NO: 4) sequence with an α-helix structure as a linking arm between a polypeptide sequence and a lipid compound to prepare new compounds, which can significantly increase the content of the α-helix structure, the stability and the antiviral activity.

The present disclosure provides compounds or pharmaceutically acceptable salts thereof or derivatives thereof, wherein:

the compounds are compounds shown in formula (I) or compounds shown in formula (II);

formula (I)

X$_1$-SVVNIQKEIDRLNEVAKNLNESLIDLQELGKYEQYIK-X$_2$-X$_3$-X$_5$;
  |
  X$_4$ formula (II)

X$_1$—SVVNIQKEIDRLNEVAKNLNESLIDLQELGKYEQYIK—X$_2$—X$_5$;
  |
  X$_4$ in formula (I) and formula (II), X$_1$ is an amino-terminal protecting group;

in formula (I) and formula (II), X$_2$ is a polypeptide with an amino acid sequence of [EAAAK(SEQ ID NO: 4)]$_n$ or A-[EAAAK(SEQ ID NO: 4)]$_n$-A; n is a natural number below 5, representing the number of repeats of an EAAAK(SEQ ID NO: 4) sequence;

in formula (I), X$_3$ is lysine or cysteine or 2,3-diaminopropionic acid (Dap) or ornithine (Or) or 2,4-diaminobutyric acid (Dab) or 2,7-diaminoheptonic acid (Dah);

in formula (I), X$_4$ is a lipophilic compound group modified on X$_3$;

in formula (II), X$_4$ is a lipophilic compound group modified on K in X$_2$; and in formula (I) and formula (II), X$_5$ is a carboxyl-terminal protecting group.

Exemplarily, X$_1$ is any one group of acetyl (Ac), amino (NH$_2$), maleoyl, succinyl, tert butoxycarbonyl or benzyloxy or other hydrophobic groups or macromolecular carrier groups.

Exemplarily, X$_5$ is any one group of amino (NH$_2$), carboxyl, hydroxy, acylamino, or tert butoxycarbonyl or other hydrophobic groups or macromolecular carrier groups.

Exemplarily, the lipophilic compound is cholesteryl hemisuccinate, 2-cholesterol acetic acid, 2-cholesterol propionic acid, 3-cholesterol propionic acid, 2-cholesterol butyric acid, 2-cholesterol isobutyric acid, 3-cholesterol butyric acid, 3-cholesterol isobutyric acid, 4-cholesterol butyric acid, 2-cholesterol valeric acid, 2-cholesterol isovaleric acid, 3-cholesterol valeric acid, 5-cholesterol valeric acid, 2-cholesterol caproic acid, 6-cholesterol caproic acid, 2-cholesterol heptylic acid, 7-cholesterol heptylic acid, 2-cholesterol octanoic acid, 8-cholesterol octanoic acid, cholesteryl bromoacetate, fatty acids containing 8 to 20 carbon atoms (such as octadecanoic acid), dihydro (nerve) sphingosine, vitamin E and other lipid compounds.

Exemplarily, the lipophilic compound is stearyl chloride.

Exemplarily, the compound is lipopeptide IPB29. The lipopeptide IPB29 is the compound shown in formula (I), X$_1$ is Ac, X$_2$ is EAAAK(SEQ ID NO: 4), X$_3$ is lysine, the lipophilic compound is cholesteryl hemisuccinate, X$_5$ is NH$_2$.

Exemplarily, the compound is lipopeptide IPB30. The lipopeptide IPB30 is the compound shown in formula (I), X$_1$ is Ac, X$_2$ is EAAAK(SEQ ID NO: 4), X$_3$ is lysine, the lipophilic compound is stearyl chloride, X$_5$ is NH$_2$.

EAAAK(SEQ ID NO: 4) is in a form where n equals to 1 in [EAAAK(SEQ ID NO: 4)]$_n$.

The present disclosure further claims polymers, which are (a1) or (a2) or (a3) as below:

(a1) a polymer formed from any one of the compounds;
(a2) a polymer formed from any one of the pharmaceutically acceptable salts;
(a3) a polymer formed from any one of the derivatives.

The present disclosure further claims uses of any one of the compounds or the pharmaceutically acceptable salts thereof or derivatives thereof, which are (b1) or (b2) or (b3) or (b4) as below:

(b1) use in preparation of a coronavirus membrane fusion inhibitor;
(b2) use in preparation of a drug for preventing and/or treating a disease caused by a coronavirus;
(b3) use as a coronavirus membrane fusion inhibitor;
(b4) use for preventing and/or treating a disease caused by a coronavirus.

The present disclosure further claims a product, wherein the product comprises any one of the compounds or the pharmaceutically acceptable salts thereof or derivatives thereof, and has the following functions (c1) or (c2):
(c1) as a coronavirus membrane fusion inhibitor; and
(c2) for preventing and/or treating diseases caused by a coronavirus.

The present disclosure further claims uses of a linker polypeptide in preparation of a product for enhancing antiviral activity and/or stability of a virus membrane fusion inhibitor, wherein the linker polypeptide has an amino acid sequence of [EAAAK(SEQ ID NO: 4)]$_n$ or A-[EAAAK(SEQ ID NO: 4)]$_n$-A; n is a natural number below 5.

The present disclosure further claims methods for enhancing antiviral activity and/or stability of a virus membrane fusion inhibitor, wherein the method comprises the following steps: linking a linker polypeptide into a virus membrane fusion inhibitor; the linker polypeptide has an amino acid sequence of [EAAAK(SEQ ID NO: 4)]$_n$ or A-[EAAAK(SEQ ID NO: 4)]$_n$-A; n is a natural number below 5.

The present disclosure further claims a method for preparing a modified virus membrane fusion inhibitor, comprising the following step (d1) or step (d2):
(d1) linking a virus membrane fusion inhibitor before modification and an $X_3(X_4)$ group by using a linker polypeptide with an amino acid sequence of [EAAAK(SEQ ID NO: 4)]$_n$ or A-[EAAAK(SEQ ID NO: 4)]$_n$-A as a linking arm to obtain a lipopeptide; in the $X_3(X_4)$ group, $X_4$ is modified on $X_3$; $X_3$ is lysine or cysteine or 2,3-diaminopropionic acid (Dap) or ornithine (Orn) or 2,4-diaminobutyric acid (Dab) or 2,7-diaminoheptonic acid (Dah); $X_4$ is a lipophilic compound group; n is a natural number below 5;
(d2) linking a virus membrane fusion inhibitor before modification and an $X_4$ group by using a linker polypeptide with an amino acid sequence of [EAAAK(SEQ ID NO: 4)]$_n$ or A-[EAAAK(SEQ ID NO: 4)]$_n$-A as a linking arm to obtain a lipopeptide; $X_4$ is a lipophilic compound group and modified on K of the linker polypeptide; n is a natural number below 5; and the lipopeptide is the modified virus membrane fusion inhibitor.

The present disclosure further claims a modified virus membrane fusion inhibitor, which is (e1) or (e2) as below:
(e1) a lipopeptide which is obtained through linking a virus membrane fusion inhibitor before modification and an $X_3(X_4)$ group by using a linker polypeptide with an amino acid sequence of [EAAAK(SEQ ID NO: 4)]$_n$ or A-[EAAAK(SEQ ID NO: 4)]$_n$-A as a linking arm; in the $X_3(X_4)$ group, $X_4$ is modified on $X_3$; $X_3$ is lysine or cysteine or 2,3-diaminopropionic acid (Dap) or ornithine (Orn) or 2,4-diaminobutyric acid (Dab) or 2,7-diaminoheptonic acid (Dah); $X_4$ is a lipophilic compound group; n is a natural number below 5;
(e2) a lipopeptide which is obtained through linking a virus membrane fusion inhibitor before modification and an $X_4$ group by using a linker polypeptide with an amino acid sequence of [EAAAK(SEQ ID NO: 4)]$_n$ or A-[EAAAK(SEQ ID NO: 4)]$_n$-A as a linking arm; $X_4$ is a lipophilic compound group and modified on K of the linker polypeptide; n is a natural number below 5; the lipopeptide is the modified virus membrane fusion inhibitor.

The present disclosure further claims pharmaceutical compounds, wherein the pharmaceutical compounds are any one of the above compounds or pharmaceutically acceptable salts thereof or derivatives thereof or any one of the polymers.

The pharmaceutical compounds have the following use (f1) or (f2) or (f3) or (f4) or (f5) or (f6):
(f1) as a coronavirus membrane fusion inhibitor;
(f2) for preventing and/or treating a disease caused by a coronavirus;
(f3) for preventing against a coronavirus;
(f4) for inhibiting a coronavirus from cell fusion;
(f5) for inhibiting a coronavirus from invading a cell;
(f6) for inhibiting a coronavirus from the replication.

The present disclosure further claims methods for treating or/and preventing coronavirus infection of an animal, comprising administering the pharmaceutical compound to a recipient animal to inhibit the coronavirus infection of the animal.

Any one of the above $X_2$ is a rigid linker.

Any one of the above linker polypeptides is a rigid linker polypeptide.

Any one of the above $X_2$ is a rigid linker with an a-helix structure.

Any one of the above linker polypeptides is a rigid linker polypeptide with an a-helix structure.

Any one of the above n may be 1 or 2 or 3 or 4 or 5.

Any one of the above $X_2$ plays a role as a linking arm, can significantly increase the content of an a-helix structure, and thus improves the stability and antiviral activity of the compounds or the pharmaceutically acceptable salts thereof or the derivatives thereof.

Any one of the above linker polypeptides plays a role as a linking arm, can significantly increase the content of an a-helix structure, and thus improves the stability and antiviral activity of a coronavirus membrane fusion inhibitor.

When $X_3$ is lysine, it is linked to a lipid compound through an amino group of a side chain thereof. When $X_3$ is cysteine, it is linked to a lipid compound through a sulfydryl group of a side chain of thereof.

When $X_3$ is lysine, a preferred lipophilic compound is cholesteryl hemisuccinate which is linked to a side chain thereof through an amidation reaction.

When $X_4$ is cysteine, a preferred lipophilic compound is cholesteryl bromoacetate.

In formula (I) and formula (II), the abbreviation of amino acids has a meaning known in the art, such as, S is serine, V is valine, N is asparagine, I is isoleucine, Q is glutamine, K is lysine, E is glutamic acid, D is aspartic acid, R is arginine, L is leucine, A is alanine, G is glycine, Y is tyrosine, C is cysteine, etc.

The amino acid may be an L-amino acid.

One or more of amino acids (such as 2-5, 2-4 or 2-3) in a polypeptide may also be replaced with a D-amino acid, an artificially modified amino acid, a rare amino acid existing in nature, etc. to improve the bioavailability, stability and/or antiviral activity of the polypeptide.

The D-amino acid refers to an amino acid corresponding to the L-amino acid that constitutes a protein.

The artificially modified amino acid refers to a common L-amino acid which is modified by methylation, phosphorylation, etc. and constitutes a protein.

The rare amino acid existing in nature comprises an unusual amino acid constituting a protein and an amino acid that does not constitutes a protein, such as 5-hydroxylysine, methylhistidine, γ-aminobutyric acid, homoserine, etc.

The present disclosure provides a novel method for designing a virus membrane fusion inhibitor lipopeptide. The lipopeptide inhibitor prepared by using the method or strategy has significantly increased helix structural characteristics and a significantly increased antiviral activity. A pharmaceutically acceptable salt, a solvate, a chelate or a non-covalent complex formed by the compound, a prodrug based on the compound, or any mixture of the above forms are also disclosed by the present disclosure.

The present disclosure provides methods for preventing and treating a disease caused by a coronavirus.

The present disclosure further provides pharmaceutical compositions comprising the compound according to the present disclosure for preventing and treating a disease caused by a coronavirus. Preferably, the pharmaceutical compositions are used in preventing and treating a disease caused by a coronavirus.

The coronavirus recited in the present disclosure includes but is not limited to various coronaviruses embodied in the examples. For example, SARS-COV-2 (a wild-type virus strain of SARS-COV-2 and various mutant strains thereof, the wild-type virus strain has a whole genome sequence described in GenBank: MN908947.3, and the mutant strains may be alpha, beta, gamma, delta, omicron and other virus strains), SARS-COV, MERS-COV, and other human coronaviruses (e.g., HCoV-229E, HCoV-OC43, HCoV-NL63, etc.). For example, a bat-derived coronavirus, a pangolin-derived coronavirus, etc.

The compound comprises different optical isomers, racemates and/or mixtures thereof. In the above case, a single enantiomer or diastereomer, such as an optical isomer, may be obtained by methods of asymmetric synthesis or racemate resolution. Racemate resolution can be realized by different methods, such as conventional recrystallization by using a resolution-assisting reagent or chromatography.

The compound comprises different cis and/or trans isomers with double bonds.

The derivatives of the compound can be a solvate of the compound, a complex of the compound, a chelate of the compound, or a non-covalent complex of the compound. The derivatives of the compound may also be a prodrug (e.g., an ester or an amide derivative of the compound) based on the compound.

In the preparation of a drug, a mixture of the above compounds in any form may be used.

In the prepared drug, a mixture may contain the above compound in any form.

A modified virus membrane fusion inhibitor prepared by using the method of the present disclosure has significantly increased helix structural characteristics and thus the antiviral activity and/or stability are significantly increased.

More content related in the present disclosure is described in detail below, or some content can be embodied in the examples of the present disclosure. Unless otherwise indicated, the number of different ingredients and reaction conditions used herein can be construed in any case as "generally" and "approximately". Accordingly, unless otherwise indicated, all numerical parameters set forth in the following description and claims are general parameters. Different numerical parameters may be obtained under respective experimental conditions due to different standard errors.

Herein, when a chemical structural formula and a chemical name of a compound are ambiguous or doubtful, the compound is exactly defined by the chemical structural formula. The compound described herein may contain one or more chiral centers, and/or double bonds and the like, and possibly there also exist stereoisomers, including isomers (e.g., geometric isomers) with double bonds, optical enantiomers, or diastereomers. Accordingly, any chemical structure within the scope of the present disclosure, whether partial or complete, including the above similar structure, includes all possible enantiomers and diastereomers of the compound, including any single stereoisomer (e.g., a single geometric isomer, a single enantiomer, or a single diastereomer), and any mixture of such stereoisomers. Mixtures of these racemates and stereoisomers may also be further resolved into enantiomers or stereoisomers of the constituents by a person skilled in the art by using a chiral separation technique or a chiral molecular synthesis.

In practice, the drug of the present disclosure may be directly administered to a patient, or mixed with a suitable carrier or excipient before being administered to a patient, so as to achieve a purpose of treating and/or preventing a coronavirus infection. The carrier material herein includes but is not limited to a water-soluble carrier material (e.g., polyethylene glycol, polyvinylpyrrolidone, organic acids, etc.), a slightly soluble carrier material (e.g., ethyl cellulose, cholesterol stearate, etc.), and an enteric carrier material (e.g., cellulose acetate phthalate, carboxy methyl ethyl cellulose, etc.). The water-soluble carrier material is preferred. These materials can be prepared into various dosage forms, including but not limited to a tablet, a capsule, a dropping pill, an aerosol, a pill, a powder, a solution, a suspension, an emulsion, a granule, a liposome, a transdermal agent, a buccal tablet, a suppository, a freeze-dried powder injection, etc. These materials may be a common preparation, a sustained release preparation, a controlled release preparation and various microparticle drug delivery systems. In order to prepare a unit dosage form into a tablet, various carriers well-known in the art can be widely used. Examples of the carriers are, for example, a diluent and an absorbent, such as starch, dextrin, calcium sulfate, lactose, mannitol, sucrose, sodium chloride, glucose, urea, calcium carbonate, porcellanite, microcrystalline cellulose, aluminum silicate, and the like; a humectant and a binder, such as water, glycerol, polyethylene glycol, ethanol, propanol, starch slurry, dextrin, syrup, honey, glucose solution, mucilago acaciae, gelatin slurry, sodium carboxymethylcellulose, lac, methylcellulose, potassium phosphate, polyvinylpyrrolidone, and the like; a disintegrating agent, such as dried starch, alginate, agar powder, laminaran, sodium bicarbonate and citric acid, calcium carbonate, polyoxyethylene, sorbitol fatty acid ester, sodium dodecyl sulfate, methyl cellulose, ethyl cellulose, and the like; a disintegration inhibitor, such as sucrose, glyceryl tristearate, cocoa butter, hydrogenated oil, and the like; an absorption promoter, such as a quaternary ammonium salt, sodium dodecyl sulfate, and the like; and a lubricant, such as talc, silica, corn starch, stearate, boric acid, liquid paraffin, polyethylene glycol, and the like. The tablet may be further prepared into a coated tablet, such as a sugar-coated tablet, a film-coated tablet, an enteric-coated tablet, or a double-layered tablet and a multi-layered tablet. In order to prepare a unit dosage form into a pill, various carriers well-known in the art can be widely used. Examples of the carriers are, for example, a diluent and an absorbent, such as glucose, lactose, starch, cocoa butter, hydrogenated vegetable oil, polyvinylpyrrolidone, gelucire, kaolin, talc, and the like; a binder, such as Arabic gum, tragacanth gum, gelatin, ethanol, honey, liquid sugar, rice paste or panada, and the like; a disintegrating agent, such as agar powder, dried starch, alginate, sodium dodecyl sulfate, methyl cellulose, ethyl cellulose, and the like. In order to prepare a unit dosage form into a suppository, various carriers well-known in the art can be widely used. Examples of the carriers are, for example, polyethylene glycol, lecithin, cocoa butter, higher alcohols, esters of higher alcohols, gelatin, semisynthetic glycerides, and the like. In order to prepare a unit dosage form into an injection preparation, such as a solution, an emulsion, a freeze-dried powder injection, and a suspension, all diluents commonly used in the art can be used, for example, water, ethanol, polyethylene glycol, 1,3-propanediol, ethoxylated isostearyl alcohol, polyoxidized isostearyl alcohol, polyoxyethylene sorbitan fatty acid ester, and the like. Furthermore, in order to prepare an isotonic injection, an appropriate amount of sodium chloride, glucose or glycerin can be added into the injection preparation, and moreover, a conventional cosolvent, a conventional buffer, a conventional pH regulating agents, and the like may also be added. Furthermore, a colorant, a preservative, a spice, a flavoring agent, a sweetener or other materials can also be added into the pharmaceutical preparation if desired. The above dosage forms can be administered by injections, including subcutaneous injection, intravenous injection, intramuscular injection, intracavitary injection, etc.; intracavitary drug delivery, such as transrectal and vaginal administration; respiratory tract administration, such as nasal administration; and mucosal administration. In the above administration routes, injection, aerosol inhalation, nasal spray or nasal drip are preferred. The administration dose of the drug of the present disclosure depends on many factors, such as the nature and severity of a disease to be prevented or treated, sex, age, body weight, and individual response of a patient or an animal, a used specific active ingredient, an administration route, the number of administrations, etc. The above doses can be administered in the form of a single dose or in several forms, for example in two, three or four dose forms.

The drug of the present disclosure may be directly and independently used for treating and preventing a person infected with a coronavirus, may also be combined with one or more other antiviral drugs so as to achieve a purpose of improving an overall treatment effect. These antiviral drugs include but are not limited to a neutralizing antibody, a protease inhibitor, an RNA-dependent RNA polymerase (RdRp) inhibitor, a virus entry inhibitor, etc. The neutralizing antibody may be one or more of amubarvimab (BRII-196), romlusevimab (BRII-198), casirivimab, imdevimab, sotrovimab, bamlanivimab, etc.; the protease inhibitor may be one or more of paxlovid, darunavir, lopinavir/ritonavir, etc.; the RdRp inhibitor may be one or more of molnupiravir, favipiravir, remdesivir, sofosbuvir, etc.; and the virus entry inhibitor may be one or more of arbidol, hydroxychloroquine, etc.

For any specific patient, a specific therapeutically effective dose level should depend on a variety of factors including a treated disorder and the severity of the disorder; the activity of the used specific active ingredient; the used specific composition; the age, body weight, general health, sex, and diet of a patient; the administration time, the administration route, and the excretion rate of the used specific active ingredient; the duration of treatment; a drug used in a combination or simultaneously used with the used specific active ingredient; and similar factors well-known in the medical field. For example, it is common in the art to start with a dose of the active ingredient at a level less than that is required to achieve a desired therapeutic effect and gradually to increase the dose until the desired effect is achieved.

The inventors of the present disclosure discover for the first time that: the compounds IPB29 and IPB30 having a formula (I) with a rigid linker EAAAK(SEQ ID NO: 4), especially IPB29, have at least a 70-fold increase in inhibitory activity against novel coronaviruses compared with compounds without the linker, and have an approximately 8-fold increase in inhibitory activity compared with compounds with a flexible linker (such as PEG or GSGSG (SEQ ID NO: 5)). At the same time, the inventors of the present disclosure find that the reason for the enhanced activity of lipopeptide IPB29 is that the rigid linker EAAAK(SEQ ID NO: 4) significantly increases the helix content of the lipopeptide and improves the stability at the same time. Moreover, the lipopeptide IPB29 can inhibit many different types of novel coronaviruses.

The compounds of the present disclosure have a stable property, are highly efficient and broad-spectrum inhibitors against novel coronavirus membrane fusion, and used in preparation of pharmaceutical compositions for preventing and treating a disease caused by a coronavirus. The pharmaceutical compositions are used for preventing and treating the disease caused by the coronavirus.

BRIEF DESCRIPTION OF THE DRAWINGS

FIG. 4 shows inhibitory activity of lipopeptides against 293T/ACE2 cell infection with various SARS-COV-2 mutant strains.

FIG. 5 shows inhibitory activity of lipopeptides against Huh-7 cell infection with various SARS-COV-2 mutant strains.

FIG. 6 shows activity of lipopeptides in inhibiting other coronaviruses.

DETAILED DESCRIPTION OF THE INVENTION

Figure 1:
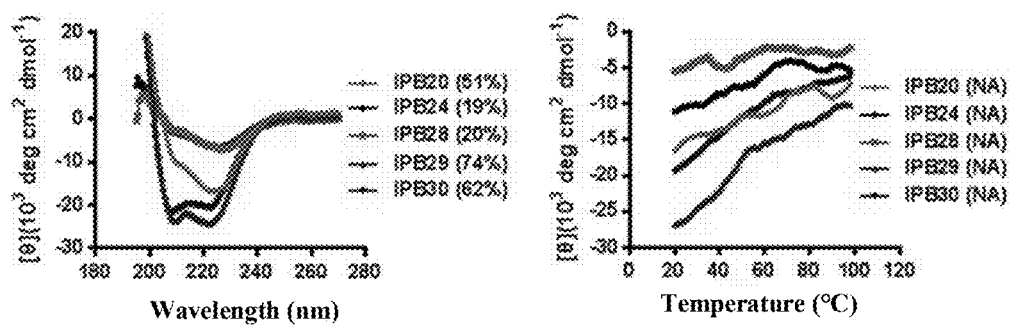
FIG. 1 shows a-helix content (left) and thermostability (right) of lipopeptides as virus membrane fusion inhibitors.

The research team of the disclosure is dedicated to research and development of virus membrane fusion inhibitors, and has designed somebroad-spectrum coronavirus membrane fusion inhibitors based on lipopeptides. The inhibitors have stronger inhibitory activities on SARS-COV-2 and mutant strains thereof (see references 2-5).

In designing the lipopeptide-based virus membrane fusion inhibitor, it is often necessary to incorporate a linker between a polypeptide sequence and a lipid group (e.g., fatty acids and cholesterol, etc.) to act as a linking arm. An expected binding site for the lipid group is a virus or cell membrane, while the polypeptide is enriched in a target region. Therefore, the lipid group and polypeptide have different binding sites. Since the polypeptide tends to form a stable secondary structure and has a relatively strong structural rigidity, a flexible linker is usually used for linking the polypeptide and lipid group, such that the polypeptide and lipid group can form suitable conformations respectively and are bound to respective binding sites. Meanwhile, when the polypeptide and lipid group fully play respective effects, mutual effects caused by steric hindrance, etc. are avoided. Common flexible linkers are combinations of glycine (G) and serine(S), such as [GGGGS (SEQ ID NO: 7)]$_n$ or [GSGSG (SEQ ID NO: 5)]$_n$, etc. By changing size of n, a distance between domains can be enlarged and reduced. Another common flexible linker is a small molecule polyethylene glycol (PEG)$_n$, where n is mostly between 2 and 24. Currently, the reported lipopeptides as a coronavirus membrane fusion inhibitor also all use flexible linkers, such as PEG$_8$ for IPB02V1-IPB02V5 (reference 2), PEG$_4$, PEG$_5$, PEG$_6$, and PEG$_8$ for IPB24-IPB27 respectively (reference 4), GSG for EKL1C (reference 6), GSGSG (SEQ ID NO: 5) and PEG$_4$ in series for EK1C4 (reference 7), and PEG$_4$ for [SARSHRC-PEG$_4$]$_2$-chol (reference 8). A common rigid linker for preparing a fusion protein has an [EAAAK(SEQ ID NO: 4)]$_n$ sequence capable of forming an a-helix, has an internal hydrogen bond and a closely-linked peptide chain backbone, and is rigid and stable. Another type of a rigid linker has a Pro-rich sequence (XP)$_n$, where X may designate any amino acid, preferably alanine, lysine or glutamic acid; and the sequence (XP)$_n$ has no helical structure, but proline therein can increase rigidity of a skeleton and effectively isolate structural domains.

The present disclosure will be further described in detail below with reference to specific examples. The given examples are only for the purpose of illustrating the present disclosure and not intended to limit the scope of the present disclosure. The provided examples below can serve as a guide for further improvement by a person skilled in the art and are not intended to limit the present disclosure in any way. A person skilled in the art can learn from the content herein and appropriately improve related parameters. It is necessary to point out that, all similar substitutions and alterations will be apparent to a person skilled in the art, and they are all deemed to be included in the scope of the present disclosure. The methods of the present disclosure have been described in terms of preferred examples. It would be apparent to a relevant person to make modifications, or appropriate variations and combinations of the compounds and preparation methods described herein to implement and use the techniques of the present disclosure without departing from the content, spirit and scope of the present disclosure.

Unless otherwise specified, the experimental methods described in the following examples are all conventional methods. The method shall be conducted in accordance with the techniques or conditions described in literatures in the art or in accordance with product specifications. The materials, reagents, etc. used in the following examples are all commercially available, unless otherwise specified.

Example 1. Preparation of Lipopeptides

The following lipopeptides were prepared: lipopeptide IPB29, lipopeptide IPB30, lipopeptide IPB20, lipopeptide IPB24, and lipopeptide IPB28.

Both lipopeptide IPB29 and IPB30 have an EAAAK(SEQ ID NO: 4) rigid linker. The Amino acid part of lipopeptide IPB29 and lipopeptide IPB30 are shown in SEQ ID NO: 1. SEQ ID NO. 1: SVVNIQKEIDRLNEVAKNLNESLIDLQELGKYEQYIKEAAAKK.

Lipopeptide IPB20 (where there is no linker as a linking arm), lipopeptide IPB24 (where there is a flexible linker PEG$_4$ as a linking arm which is derived from Fmoc-NH-PEG$_4$-CH$_2$CH$_2$COOH as a synthetic material), and lipopeptide IPB28 (where there is a flexible linker GSGSG (SEQ ID NO: 5) as a linking arm) were all used as control samples.

Lipopeptide IPB29 and lipopeptide IPB30 both meet the following general formula:

formula (I)

In lipopeptide IPB29, X$_1$ is an amino-terminal protecting group Ac, X$_2$ is an EAAAK(SEQ ID NO: 4) rigid linker, X$_3$ is a lysine residue, X$_4$ is cholesteryl hemisuccinate group modified on X$_3$, X$_5$ is a carboxyl-terminal protecting group NH$_2$.

In lipopeptide IPB30, X$_1$ is an amino-terminal protecting group Ac, X$_2$ is an EAAAK(SEQ ID NO: 4) rigid linker, X$_3$ is a lysine residue, X$_4$ is a stearyl chloride group modified on X$_3$, X$_5$ is a carboxyl-terminal protecting group NH$_2$.

The sequence structures of 5 lipopeptides are shown in Table 1. In the five lipopeptides, Ac represents an acetyl group, NH$_2$ represents an amino group, and EAAAK(SEQ ID NO: 4) represents a short peptide whose amino acid sequence is EAAAK(SEQ ID NO: 4).

TABLE 1

Sequence structures of 5 lipopeptides

| Lipopeptide | Sequence structure |
|---|---|
| IPB20 | Ac-SVVNIQKEIDRLNEVAKNLNESLIDLQELGKYEQYIK (SEQ ID NO: 3)-(cholesteryl hemisuccinate)-NH$_2$ |
| IPB24 | Ac-SVVNIQKEIDRLNEVAKNLNESLIDLQELGKYEQYIK (SEQ ID NO: 3)-(PEG$_4$)K(cholesteryl hemisuccinate)-NH$_2$ |
| IPB28 | Ac-SVVNIQKEIDRLNEVAKNLNESLIDLQELGKYEQYIKGSGSGK (SEQ ID NO: 2)-(cholesteryl hemisuccinate)-NH$_2$ |
| IPB29 | Ac-SVVNIQKEIDRLNEVAKNLNESLIDLQELGKYEQYIKEAAAKK (SEQ ID NO: 1)-(cholesteryl hemisuccinate)-NH$_2$ |
| IPB30 | Ac-SVVNIQKEIDRLNEVAKNLNESLIDLQELGKYEQYIKEAAAKK (SEQ ID NO: 1)-(stearyl chloride)-NH$_2$ |

The structural differences among the 5 lipopeptides are shown in Table 2.

TABLE 2

Structural differences of 5 lipopeptides

| Lipo-peptide | Amino-terminal protecting group | Antiviral polypeptide sequence | Linker as a linking arm | Amino acid for modification | Lipophilic compound for modification | Carboxyl-terminal protecting group |
|---|---|---|---|---|---|---|
| IPB20 | Ac | SVVNIQKEIDRLNEVAKNLNE SLIDLQELGKYEQYIK (SEQ ID NO: 3) | No linker | — | Cholesteryl hemi-succinate | $NH_2$ |
| IPB24 | Ac | SVVNIQKEIDRLNEVAKNLNE SLIDLQELGKYEQYIK (SEQ ID NO: 3) | Flexible linker $PEG_4$ | K | Cholesteryl hemi-succinate | $NH_2$ |
| IPB28 | Ac | SVVNIQKEIDRLNEVAKNLNE SLIDLQELGKYEQYIK (SEQ ID NO: 3) | Flexible linker GSGSG (SEQ ID NO: 5) | K | Cholesteryl hemi-succinate | $NH_2$ |
| IPB29 | Ac | SVVNIQKEIDRLNEVAKNLNE SLIDLQELGKYEQYIK (SEQ ID NO: 3) | Rigid linker EAAAK (SEQ ID NO: 4) | K | Cholesteryl hemi-succinate | $NH_2$ |
| IPB30 | Ac | SVVNIQKEIDRLNEVAKNLNE SLIDLQELGKYEQYIK (SEQ ID NO: 3) | Rigid linker EAAAK (SEQ ID NO: 4) | K | Stearyl chloride | $NH_2$ |
| Difference | Same | Same | Different | | Different | Same |

I. Chemical Reagents Required in Preparation Process

All chemical reagents such as various Fmoc amino acids, N,N'-diisopropylcarbodiimide (DIC), 1-hydroxybenzotriazole (HOBt), N,N-dimethylformamide (DMF), piperidine (PIPE), ninhydrin, acetic anhydride ($Ac_2O$), N,N-diisopropylethylamine (DIEA), hydrazine hydrate, cholesterol monosuccinate, stearyl chloride, trifluoroacetic acid (TFA), ethanedithiol (EDT), thioanisole (TA), triisopropylsilane (TIPS), phenol, N-fluorenyl methoxycarbonyl tetrapolyethylene glycol-carboxylic acid (Fmoc-NH-$PEG_4$-$CH_2CH_2COOH$), etc. are purchased from major chemical reagent suppliers without further purification before use.

Amino acid-protecting raw materials used in a polypeptide synthesis process comprise Fmoc-Lys(Dde)-OH, Fmoc-Lys(Boc)-OH, Fmoc-Gly-OH, Fmoc-Ala-OH, Fmoc-Ser(tBu)-OH, Fmoc-Glu(OtBu)-OH, Fmoc-Ile-OH, Fmoc-Tyr(tBu)-OH, Fmoc-Gln(Trt)-OH, Fmoc-Gly-OH, Fmoc-Leu-OH, Fmoc-Asp-(OtBu)-OH, Fmoc-Ser(tBu)-OH, Fmoc-Asn(Trt)-OH, Fmoc-Val-OH, and Fmoc-Arg (Pbf)-OH. The abbreviations have a well-known definition: Fmoc is 9-fluorenyl methoxycarbonyl, Dde is 1-(4,4-dimethyl-2,6-dioxo-cyclohexylidene)ethyl, Boc is tert-butoxycarbonyl, tBu is tert butyl, OtBu is tert-butyloxy, Trt is triphenylmethyl, and Pbf is (2,3-dihydro-2,2,4,6,7-pentamethylbenzofuran-5-yl) sulfonyl.

II. Synthesis of Peptide Resin

Rink Amide MBHA resin was used as the carrier resin and successively coupled with protected amino acids corresponding to polypeptide amino acid sequences through Fmoc protection and a coupling reaction to prepare a peptide resin.

1. Incorporation of 1st Protected Amino Acid into the Main Chain 0.3 mmol of a 1st protected amino acid Fmoc-Lys(Dde)-OH and 0.3 mmol of HOBt were taken and dissolved in a proper amount of DMF; another 0.3 mmol of DIC was taken and slowly added into a DMF solution of protected amino acids under oscillation, and reaction was performed under oscillation at a room temperature for 5 min to obtain an activated protected amino acid solution for later use.

0.1 mmol of a Rink Amide MBHA resin (0.35 mmol/g*0.3 g) was deprotected with 25% of a PIPE/DMF solution (vol/vol) for 20 min (twice), and the obtained product was washed and filtered to obtain an Fmoc-removed resin.

The activated 1st protected amino acid solution was added into the Fmoc-removed resin, a coupling reaction was performed for 60 min, and the reaction product was filtered and washed to obtain a resin containing the 1st protected amino acid Fmoc-Lys(Dde).

2. Incorporation of Other Protected Amino Acids into the Main Chain

Other protected amino acids corresponding to the polypeptide were sequentially incorporated by using the same method for incorporating the 1st protected amino acid into the main chain to obtain a resin containing main-chain amino acids. Finally, acetylation capping was performed on N-terminus by using 0.3 mmol of $Ac_2O$ and 0.6 mmol of DIEA to complete the synthesis of the main chain. After each step of the above reaction, the reaction was controlled by a Kaiser test. If a condensation reaction of a certain amino acid is not complete, the condensation is repeated once until a required target peptide segment is obtained.

3. Incorporation of Side Chains (1) A Dde protecting group of a C-terminal lysine side chain was removed by treating the resin with a small volume of 2% hydrazine hydrate/DMF solution (vol/vol) to the greatest extent (10 min, twice), and an obtained product was filtered and washed to obtain a Dde-removed resin for later use.

(2) Cholesterol modification of polypeptide: 0.3 mmol of cholesteryl hemisuccinate and 0.3 mmol of HOBt were taken and dissolved by a proper amount of DMF; another 0.3 mmol of DIC was slowly added to a solution containing cholesteryl hemisuccinate and HOBt, and reaction was performed under oscillation at a room temperature for 5 min. The prepared solution above containing the cholesteryl hemisuccinate, HOBt, and DIC was added into the Dde-removed resin obtained in step (1), a coupling reaction was performed for 60 min, and the obtained reaction product was filtered, washed, and dried to obtain a peptide resin.

(3) Stearylation of polypeptide: 0.3 mmol of stearyl chloride and 0.6 mmol of DIEA were taken and dissolved in a proper amount of DMF, and slowly added into the Dde-removed resin obtained in step (1), reaction under oscillation was performed at a room temperature for 60 min, and the obtained product was filtered, washed, and dried to obtain a peptide resin.

III. Preparation of Crude Product

The lysis reagent (15 mL of a lysis reagent per gram of resin) was added into the peptide resin, after uniformly mixing, the mixture was subjected to a reaction under oscillation at 30° C. for 3 hours. The target polypeptide was cleaved from the resin, and the side chain protecting group was removed. The reaction mixture filtrate was collected, and the resin was washed for 3 times with a small amount of TFA/DCM. The filtrates were combined, precipitated with anhydrous ether, and centrifuged. A filter cake was washed with cold anhydrous ether for 2 times, and dried to obtain a white powder, that is, a lipopeptide crude product.

The composition of the lysis reagent was that: trifluoroacetic acid: 1,2-ethanedithiol: thioanisole: phenol: $H_2O$: triisopropylsilane=68.5:10:10:5:3.5:1 (volume ratio).

IV. Preparation of Pure Product

The lipopeptide crude product was added into water/acetonitrile. The mixture was stirred and dissolved, and centrifuged to remove insoluble substances for later use. The obtained product was purified by a reversed-phase high-performance liquid chromatography. The chromatographic column has a model of Agela C18 (10 μm, 100 Å, 50×250 mm) wherein a mobile phase consists of a mobile phase A (water solution of 0.05% TFA and 2% acetonitrile) and a mobile phase B (90% acetonitrile/water solution). The mobile phase has a flow rate of 25 mL per min. An ultraviolet detection wavelength is 220 nm. The crude product solution was taken and loaded on the chromatographic column, a gradient elution was performed, and the corresponding purified component was collected and directly freeze-dried to remove the solvent to obtain a pure product of trifluoroacetate polypeptide in a fluffy state.

The pure product of trifluoroacetate polypeptide was redissolved in water and acetonitrile, a large amount of an anion exchange resin (in the form of acetate ion) was added, and the mixture was stirred for 3 hours. The obtained product was filtered, the ion exchange resin was rinsed with a mixed solvent of water and acetonitrile. The filtrates were combined and freeze-dried to obtain a pure product of polypeptide acetate in a fluffy state (Table 1).

The chemical structures of the lipopeptides in Table 1 were characterized by a MALDI-TOF mass spectrometry, and the purity was determined by an analytical high-performance liquid chromatography (Agela C18-4.6×250 mm, flow rate of 1 mL per min). The results showed that each of the purity of the synthesized lipopeptides was greater than 95%.

Example 2. Structural Characteristics of Lipopeptides and Analysis of Interaction with Target Sequences A secondary structure (α-helix) and thermostability of the to-be-tested lipopeptides, and the interaction between the to-be-tested lipopeptides and polypeptides simulating a target sequence were determined by using a circular dichroism (CD) technique. Regarding the specific method, please refer to the papers published by the present inventors (see reference 4 and reference 5). The polypeptide N52 simulating a target sequence is derived from an HR1 sequence of the subunit S2 of the SARS-COV-2 spike protein. The N52 has a sequence structure as follows: Ac-FNGIGVTQNVLY-ENQKLIANQFNSAIGKIQDSLSSTASAL-GKLQDVVNQNAQ-$NH_2$. (An amino acid sequence contained in N52 was shown in SEQ ID: 6)

The to-be-tested lipopeptides: lipopeptide IPB29, lipopeptide IPB30, lipopeptide IPB20, lipopeptide IPB24 or lipopeptide IPB28 prepared in example 1. The to-be-tested complexes: mixtures of the to-be-tested lipopeptides and N52.

1. The to-be-tested lipopeptides (or the to-be-tested complexes) were prepared into a 10 μM solution by using a phosphate buffered saline (PBS, pH7.2) (for the to-be-tested complexes, 10 μM means that the to-be-tested lipopeptides and N52 were both at a concentration of 10 μM), and the solution was placed in a water-bath pot at 37° C. for 30 min.

2. The solution obtained in step 1 was transferred to a corresponding cuvette, the change of a molar ellipticity [θ]λ of the solution was scanned in a wavelength range of 195-270 nm by using a Jasco spectropolarimeter (model J-815), a typical a-helix structure can generate a maximum negative peak at 208 nm and 222 nm. The spectrum value was corrected by subtracting a PBS blank control, the peak value of −33,000 degree.cm2.dmol-1 was as a standard of 100% of a-helix content in the calculation process. The percent of the α-helix content was calculated according to the molar ellipticity of the solution at 222 nm.

3. The solution obtained in step 1 was added into a thermostability detection cuvette and a CD temperature control module was adjusted to scan the change of the solution [θ]222 along with the temperature at a speed of 2° C. per min at a temperature of 20-98° C. A melting curve was smoothed, and the midpoint temperature value (Tm) of the thermal dissociation transition was calculated by using an Origin software to reflect a thermostability degree of helixes.

The CD results for the lipopeptides were shown in FIG. 1. IPB20 without flexible or rigid linkers had the α-helix content of 51%; and IPB24 and IPB28 with flexible linkers had the α-helix content of 19% and 20% respectively. This suggests that the introduction of the flexible linker improves an integral rotational freedom degree of the lipopeptides, increases an integral molecular entropy of the lipopeptides, and is unfavorable for stabilizing the secondary structure of the polypeptide. IPB29 and IPB30 with rigid linkers had the α-helix content of 74% and 62% respectively. This suggests that the introduction of an EAAAK(SEQ ID NO: 4) sequence significantly increases the helix structures of the lipopeptides. This may be due to a fact that an E-K salt bridge in the EAAAK(SEQ ID NO: 4) linker conjugates with a salt bridge in a-helix secondary structure of the polypeptide, which can stabilize the secondary structure, meanwhile A is more prone to form the a-helix structure comparing with G. The relatively high content of a-helix can effectively reduce a binding entropy of a polypeptide part of the lipopeptides with a target, increase a binding constant, and improve the activity. The relatively stable secondary structure is also conducive to the polypeptide to resist hydrolysis by a protease in vivo, improves the stability in vivo, and is also beneficial to the antiviral activity.

Figure 2:
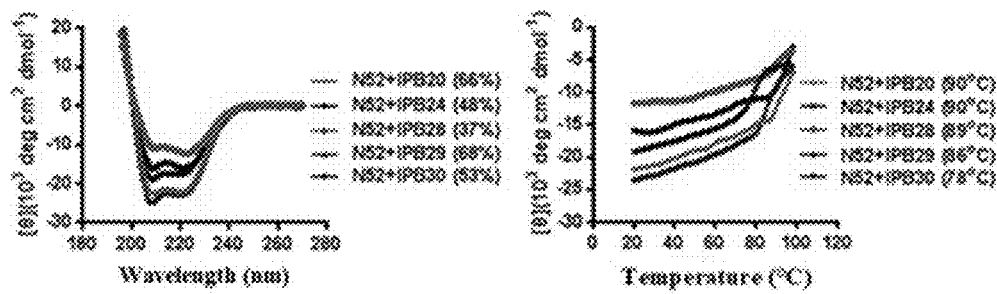
FIG. 2 shows a-helix content (left) and thermostability (right) of lipopeptide and target sequence polypeptide complexes as a virus membrane fusion inhibitor.

The CD results of the complexes were shown in FIG. 2. Each lipopeptide can interact with the polypeptide simulating a target sequence to form a complex with a typical a-helix structure, wherein the IPB20-N52 complex, IPB24-N52 complex, and IPB28-N52 complex had the α-helix content of 66%, 48%, and 37%, respectively, and the IPB29-N52 complex and IPB30-N52 complex had the α-helix content of 68% and 53%, respectively (left of FIG. 2). Tm values of the IPB20-N52 complex, IPB24-N52 complex, and IPB28-N52 complex were 90° C., 90° C., and 89° C., respectively. Tm values of the IPB29-N52 complex and IPB30-N52 complex were 86° C. and 78° C., respectively (right of FIG. 2). This indicates that the lipopeptides with an EAAAK(SEQ ID NO: 4) linker can maintain a specific and stable binding with a target, and increase the binding capability with a cell membrane and a virus membrane.

Example 3. Inhibitory effect of lipopeptides on novel coronavirus SARS-COV-2 and mutant strains 293T cell is a product in the American Type Culture Collection (ATCC, Cat. No. CRL-3216). Huh-7 cell is a product of a national experimental cell resource sharing platform. 293T/ACE2 cells are described in reference 2.

Test cells: 293T/ACE2 cells or Huh-7 cells.

I. Inhibitory Effect of Lipopeptides on Novel Coronavirus SARS-COV-2

The to-be-tested lipopeptides: lipopeptide IPB29, lipopeptide IPB30, lipopeptide IPB20, lipopeptide IPB24 or lipopeptide IPB28 prepared in example 1.

1. Preparation of SARS-COV-2 Pseudovirus

The plasmid expressing an S protein of SARS-COV-2 (defined as pCoV2-S) is described in "a plasmid expressing the S protein of SARS-COV-2" in "Single-cycle infection assay" of the section of materials and methods of reference 5. The HIV backbone plasmid pNL4-3.luc.RE was provided by the project of acquired immunodeficiency syndrome reagents and reference substances of National Institutes of Health (Cat. No. 3418).

pCoV2-S and pNL4-3.luc.RE were co-transfected into 293T cells at a ratio of 1:1, the cells were cultured in a 5% $CO_2$ cell incubator at 37° C. for 48 hours, and the supernatant containing SARS-COV-2 pseudovirus was collected, filtered, and stored at −80° C. for later use.

The prepared SARS-COV-2 pseudovirus was "SARS-COV-2 pseudovirus (SARS-COV-2 PV, hereinafter also referred to as SARS-COV-2 WT)" in reference 2.

2. Inhibitory effect of lipopeptides on SARS-COV-2

(1) The to-be-tested lipopeptides were dissolved in deionized water, and the concentration was measured. The solution was diluted to the initial concentration by using DMEM culture medium, 3-fold dilution was performed in a 96-well cell culture plate, and finally, each well contained 50 μL of a lipopeptide solution. 9 dilutions were set with 3 replicate wells per dilution. A control well was set with a DMEM culture medium (50 μL per well).

(2) After step (1) was completed, 50 μL (virus amount was 500 $TCID_{50}$) of the pseudovirus prepared in step 1 was added per well and then incubated at a room temperature for 30 min. (3) The pre-cultured test cells were adjusted to $10×10^4$ cells/mL of a cell suspension, DEAE-dextran was added to a concentration of 15 μg/mL, and then the cells were added to a 96-well plate (100 μL/well) completed in step (2) and cultured in a 5% $CO_2$ cell incubator at 37° C. for 48 hours.

(4) After step (3) is completed, the supernatant was discarded. The cell lysate was added at 30 μL/well, lysis at a room temperature was performed at 15 min, then a luciferase substrate (Promega company) was added, a relative fluorescence unit (RLU) was measured by using a microplate chemiluminescence detector, and an inhibitory rate curve and a drug half-maximal inhibitory concentration ($IC_{50}$) were calculated and manufactured.

Figure 3:
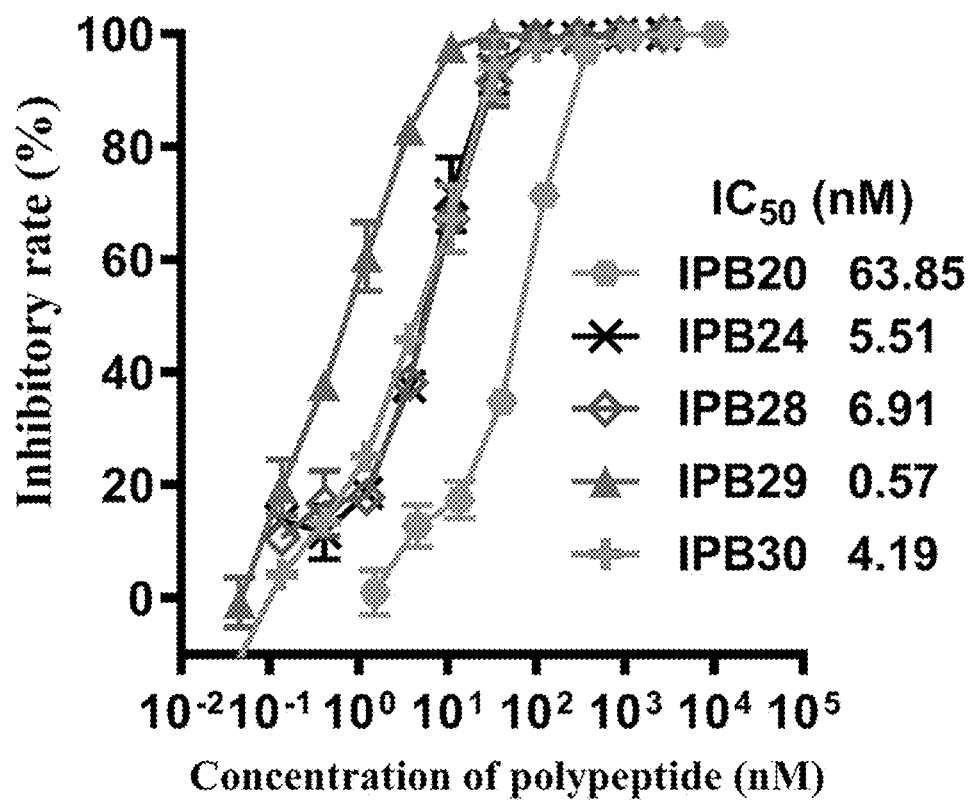
FIG. 3 shows activity of lipopeptides in inhibiting SARS-COV-2 infection of 293T/ACE2 cells (top) or Huh-7 cells (bottom).
Figure 3:
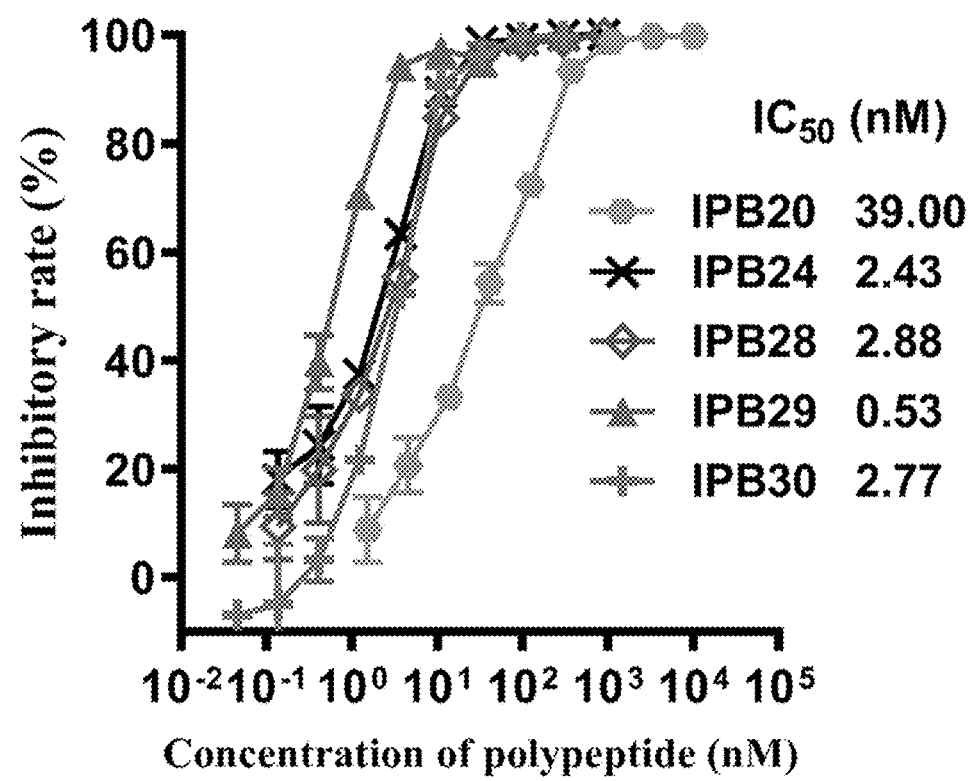

The results were shown in FIG. 3. $IC_{50}$ values of IPB20, IBP24, IBP28, IBP29, and IBP30 in inhibiting SARS-COV-2 infection of 293T/ACE2 cells were 63.85 nM, 5.51 nM, 6.91 nM, 0.57 nM, and 4.19 nM, respectively; and $IC_{50}$ values of IPB20, IBP24, IBP28, IBP29, and IBP30 in inhibiting SARS COV-2 infection of Huh-7 cells were 39 nM, 2.43 nM, 2.88 nM, 0.53 nM, and 2.77 nM, respectively. The difference between IPB29 and IPB20 was that IPB29 contained a rigid linker EAAAK(SEQ ID NO: 4), while IPB20 was free of a rigid or flexible linker. Compared with IPB20, IPB29 had the antiviral activity increased by about 112 times in the 293T/ACE2 cells and increased by about 74 times in the Huh-7 cells. The difference between IPB29 and IPB24 was that IPB29 contained a rigid linker EAAAK (SEQ ID NO: 4), while IPB24 contained a flexible linker $PEG_4$. Compared with IPB24, IPB29 had the antiviral activity increased by about 10 times in the 293T/ACE2 cells and increased by about 5 times in the Huh-7 cells. The difference between IPB29 and IPB28 was that IPB29 contained a rigid linker EAAAK(SEQ ID NO: 4), while IPB28 contained a flexible linker GSGSG (SEQ ID NO: 5). Compared with IPB28, IPB29 had the antiviral activity increased by about 12 times in the 293T/ACE2 cells and increased by about 5 times in the Huh-7 cells. The experimental results indicated that the EAAAK(SEQ ID NO: 4) linker significantly enhanced the inhibitory activity of the lipopeptides as an inhibitor, for example, inhibitory activity of IPB29 and IPB30 on SARS-COV-2.

II. Inhibitory Effect of Lipopeptides on Novel Coronavirus SARS-COV-2 Mutants

Test lipopeptides: lipopeptide IPB29, lipopeptide IPB30, lipopeptide IPB24 or lipopeptide IPB28 prepared in example 1.

1. Preparation of Pseudoviruses of SARS-COV-2 Mutants

Various pseudoviruses of novel coronavirus SARS-COV-2 mutants were prepared respectively and the mutants were shown in FIG. 4.

The method referred to 1 in step I. The difference was only that the plasmid expressing the S protein of SARS-COV-2 was replaced into a plasmid expressing an S protein of a mutant (single point mutation or representative epidemic virus strain) of SARS-COV-2.

The prepared pseudovirus of a D614G mutant of SARS-COV-2 was "D614G PV" in reference 2.

2. Inhibitory Effect of Lipopeptides on SARS-COV-2 Mutants

The method was the same as 2 in step I.

The results were shown in FIG. 4 when the test cell was 293T/ACE2 cells. In the 293T/ACE2 cells, $IC_{50}$ values of IPB24, IPB28, IPB29, and IPB30 in inhibiting an infection by a Delta virus strain were 4.94 nM, 6.30 nM, 0.79 nM, and 3.57 nM respectively. The $IC_{50}$ value of IPB24, IPB28, and IPB30 was about 6 times, 8 time, and 4 times higher than that of IPB29, respectively. In the 293T/ACE2 cells, $IC_{50}$ values of IPB24, IPB28, IPB29, and IPB30 in inhibiting an infection by an Omicron virus strain were 4.51 nM, 4.51 nM, 0.47 nM, and 1.78 nM respectively. The $IC_{50}$ value of IPB24, IPB28, and IPB30 was about 10 times, 10 times, and 4 times higher than that of IPB29, respectively.

The results were shown in FIG. 5 when a test cell was Huh-7 cells. In the Huh-7 cells, $IC_{50}$ values of IPB24, IPB28, IPB29, and IPB30 in inhibiting an infection by a Delta virus strain were 3.46 nM, 4.34 nM, 0.56 nM, and 2.17 nM respectively. The $IC_{50}$ value of IPB24, IPB28, and IPB30 was about 6 times, 8 times, and 4 times higher than that of IPB29, respectively. In the Huh-7 cells, $IC_{50}$ values of IPB24, IPB28, IPB29, and IPB30 in inhibiting an infection by an Omicron virus strain were 2.56 nM, 2.46 nM, 0.46 nM, and 1.46 nM respectively. The $IC_{50}$ value of IPB24, IPB28, and IPB30 was about 6 times, 5 times, and 3 times higher than that of IPB29, respectively. The results indicated that novel lipopeptides (such as IPB29 and IPB30), as a virus membrane fusion inhibitor, had a good inhibitory activity against various SARS-COV-2 mutants (mutant strains).

Example 4. Inhibitory Effect of Lipopeptides on Other Coronaviruses

Test lipopeptides: lipopeptide IPB29, lipopeptide IPB30, lipopeptide IPB24 or lipopeptide IPB28 prepared in example 1.

Test cells: 293T/ACE2 cells or Huh-7 cells.

1. Preparation of Pseudoviruses of Other Coronaviruses

Pseudoviruses of various other coronaviruses were prepared respectively. Other coronaviruses were specifically as follows: a bat-derived coronavirus (bat RaTG13), a pangolin-derived coronavirus (PCo V-GD or PCOV GX), SARS-COV, MERS—COV, HCoV-NL63, and HCo V-229E.

The method referred to 1 in step I of example 3. The difference was only that the plasmid expressing the S protein of SARS-COV-2 was replaced into a plasmid expressing an S protein of other coronaviruses.

The prepared pseudovirus of SARS-COV was "SARS-COV PV" in reference 2.

The prepared pseudovirus of MERS-COV was "MERS-COV PV" in reference 2.

The prepared pseudovirus of HCo V-NL63 was "HCo V-NL63 PV" in reference 2.

The prepared pseudovirus of HCoV-229E was "HCoV-229E PV" in reference 2.

2. Inhibitory Effect of Lipopeptides on Other Coronaviruses

The method was the same as 2 in step I of example 3.

The results were shown in FIG. 6. The results showed that the novel lipopeptides could effectively inhibit infection of the above seven viruses. In the 293T/ACE2 cells, highest $IC_{50}$ values of IPB24, IPB28, and IPB30 in inhibiting an infection by a bat RaTG13 virus strain, a PCOV-GD virus strain, and a PCOV-GX virus strain were about 4 times, 6 times, and 5 times higher than that of IPB29, respectively. In the Huh-7 cells, highest $IC_{50}$ values of IPB24, IPB28, and IPB30 in inhibiting an infection by a SARS-COV virus strain, a MERS-COV virus strain, an HCoV-NL63 virus strain, and an HCoV-229E virus strain were about 11 times, 7 times, 9 times, and 7 times higher than that of IPB29, respectively. As can be seen that, lipopeptides IPB29 and IPB30 both had a strong inhibitory effect on other coronaviruses, especially IPB29. Compared with other lipopeptides, IPB29 still showed the strongest inhibitory activity against SARS—COV, PCOV-GD, and PCOV-GX closely related to SARS-COV-2.

Example 5. In-Vitro Cytotoxicity and Therapeutic Index Analysis of Lipopeptides

Test lipopeptides: lipopeptide IPB29, lipopeptide IPB30, lipopeptide IPB24 or lipopeptide IPB28 prepared in example 1.

Test cells: 293T/ACE2 cells or Huh-7 cells.

An in-vitro cytotoxicity detection of the test lipopeptides was performed with a CCK-8 cell proliferation/toxicity detection kit (manufacturer: Abbkine and article number: KTC011001). Specific steps: (1) the tested lipopeptides were diluted in a gradient of 3 times in a 96-well cell culture plate and finally each well contained 100 μL of a lipopeptide solution; 9 dilutions were set with 3 replicate wells per dilution; and a control well containing a DMEM medium (100 μL per well) was set; (2) $10 \times 10^4$ cells/mL of a test cell suspension was added to the 96-well cell culture plate after step (1) was completed in 100 μL/well and cultured at 37° C. and 5% $CO_2$ for 48 hours; and (3) after step (2) was completed, 20 μL of a CCK-8 solution was added into each well, the culture plate was continuously incubated in an incubator for 2 hours, and then the absorbance (OD450) at 450 nm was measured with a microplate reader. A GraphPad Prism software was used to draw an inhibitory rate curve and calculate the half cytotoxicity concentration (CC50) of a drug.

Figure 7:
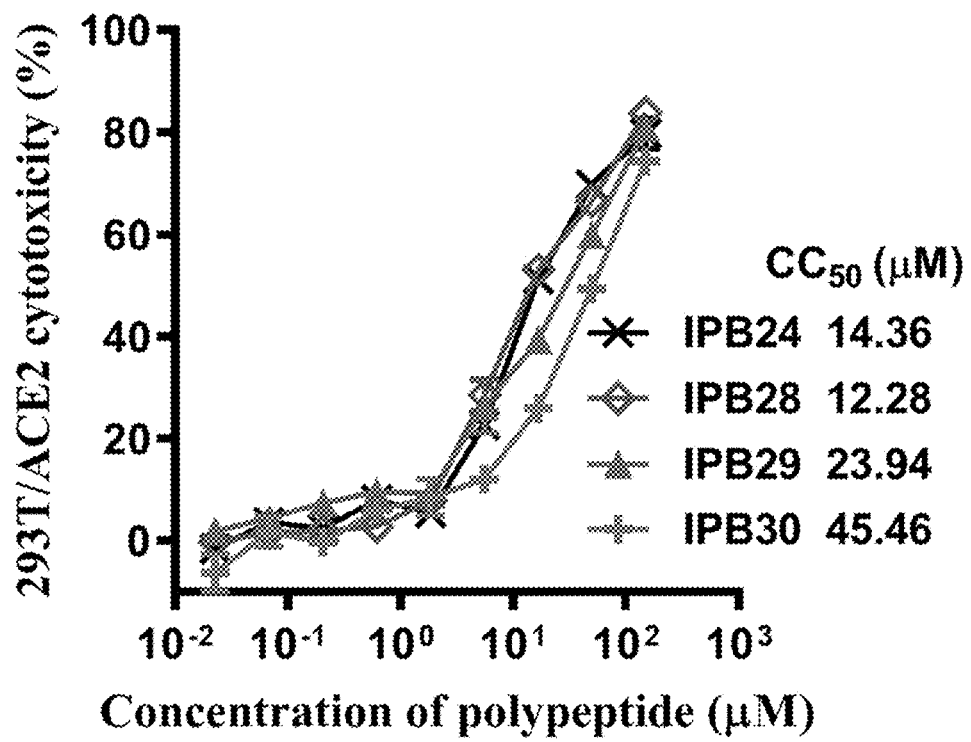
FIG. 7 shows results of in-vitro cytotoxicity assay of lipopeptides.
Figure 7:
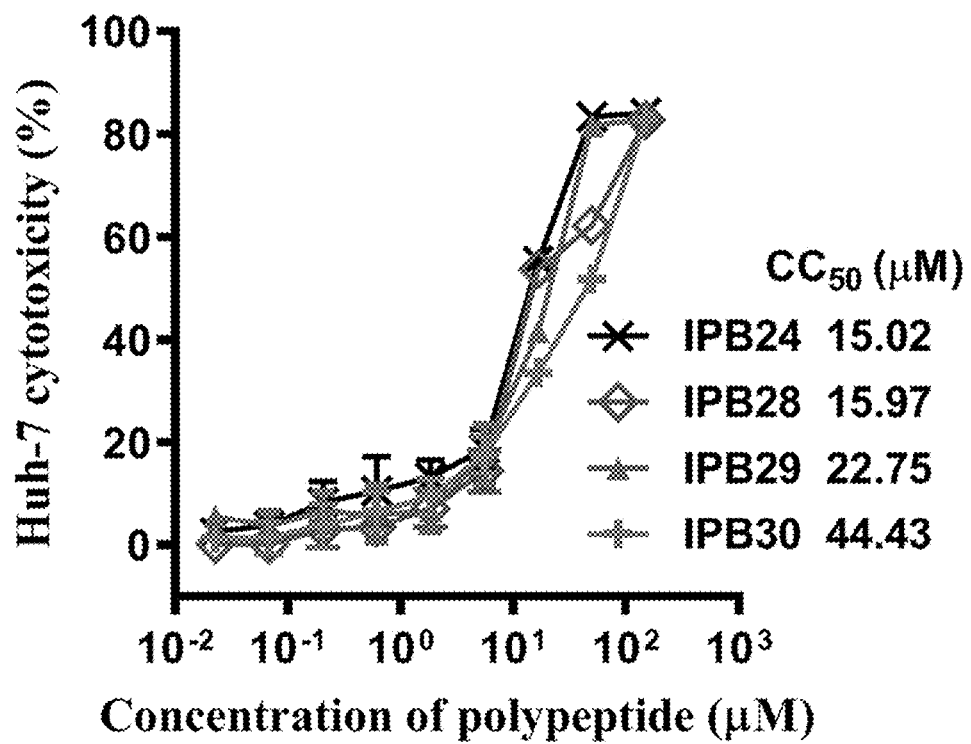

The results were shown in FIG. 7. The CC50 values of four lipopeptides, IBP24, IBP28, IBP29, and IBP30 were 14.36 μM, 12.28 μM, 23.94 μM, and 45.46 μM respectively in the 293T/ACE2 cells, and 15.02 μM, 15.97 μM, 22.75 μM, and 44.43 μM respectively in the Huh-7 cells. In comparison, IBP29 and IBP30 had relatively low cytotoxicity, especially IPB30 modified by a stearyl chloride group.

According to a CC50/IC$_{50}$ analysis (IC$_{50}$ data was obtained in example 3), the four polypeptides all had an extremely high selective therapeutic index (TI). For example, for the inhibitory activity of the 293T/ACE2 cells infected by the Omicron mutant strain, the TI values of IPB24, IPB28, IPB29, and IPB30 were as high as about 3,184, 2,723, 50,936, and 25,539 respectively, and the TI value of IPB29 was about 16 times, 19 times, and 2 times of that of IPB24, IPB28, and IPB30 respectively. For example, for the inhibitory activity of the Huh-7 cells infected by the Omicron mutant strain, the TI values of IPB24, IPB28, IPB29, and IPB30 were as high as about 5,867, 6,492, 49,457, and 30,432 respectively, and the TI value of IPB29 was about 8 times, 8 times, and 1.6 times of that of IPB24, IPB28, and IPB30 respectively. It can be seen that IBP29 and IBP30 had a higher therapeutic index than IBP24 and IBP28, and therefore had a higher druggability.

Example 6. Study on Stability of Inhibitor Lipopeptides

In the example, the inventors compared and analyzed stability of representative lipopeptides IPB24 and IPB29 from various angles, including digestion by protease, digestion by liver microsomes, incubation with human serum, and long-term placement at 37° C.

Test lipopeptides: lipopeptide IPB29 and lipopeptide IPB24 prepared in example 1.

A method for detecting the antiviral activity of the lipopeptides was the same as step I of example 3 (test cell: 293T/ACE2 cells).

I. Digestion by Protease

Test proteases: protease K, trypsin, and a-chymotrypsin. The protease K, trypsin, and α-chymotrypsin were purchased from Sigma-Aldrich with the product article number of P2308, T4799, and C4129 respectively.

The test lipopeptides were mixed with the test proteases according to a final concentration of 2 mg/mL and 0.1 mg/mL respectively, the mixture was incubated at 37° C. for 0, 30, 60, 120 or 180 min respectively, and the antiviral activity of the lipopeptides was detected.

II. Digestion by Liver Microsomes

A phase I metabolic stability kit/human liver microsome (mixed) reagent was purchased from iPhase Pharmaceutical Services with the article number of 0111A1.03. An experimental method shall be performed according to the instructions provided by the manufacturer. 10 μL of a solution A and 2 μL of a solution B in the kit were evenly mixed with 28 μL of 0.1 M of a PBS buffer, and the mixture was pre-incubated at 37° C. for 5 min, then sub-packaged in 40 μL/tube, subjected to a warm bath in water bath at 37° C., and prepared into a pre-incubation solution for later use. 154 μL of 0.1 M of a PBS buffer, 5 μL of liver microsomes, and 1 μL of the test lipopeptide solutions at a concentration of 4 mM were mixed, 40 μL of the pre-incubation solution was added, the mixture was immediately incubated in a 37° C. water bath, and timing was conducted. Different incubation time points were set, 200 μL of precooled acetonitrile was added into the incubation system to terminate the reaction, and the antiviral activity of the lipopeptides was detected.

III. Stability Experiment of Human Serum

20% human serum and the test lipopeptides at a final concentration of 150 μM were mixed, the mixture was incubated at 37° C. for 0, 5, 30, 60, 120 or 180 min respectively, and the antiviral activity of the lipopeptides was detected.

IV. Temperature Stability Experiment

The test lipopeptide aqueous solutions at a concentration of 300 μL were placed at 37° C. for different time and the change of the antiviral activity was detected.

V. Result Analysis

Figure 8:
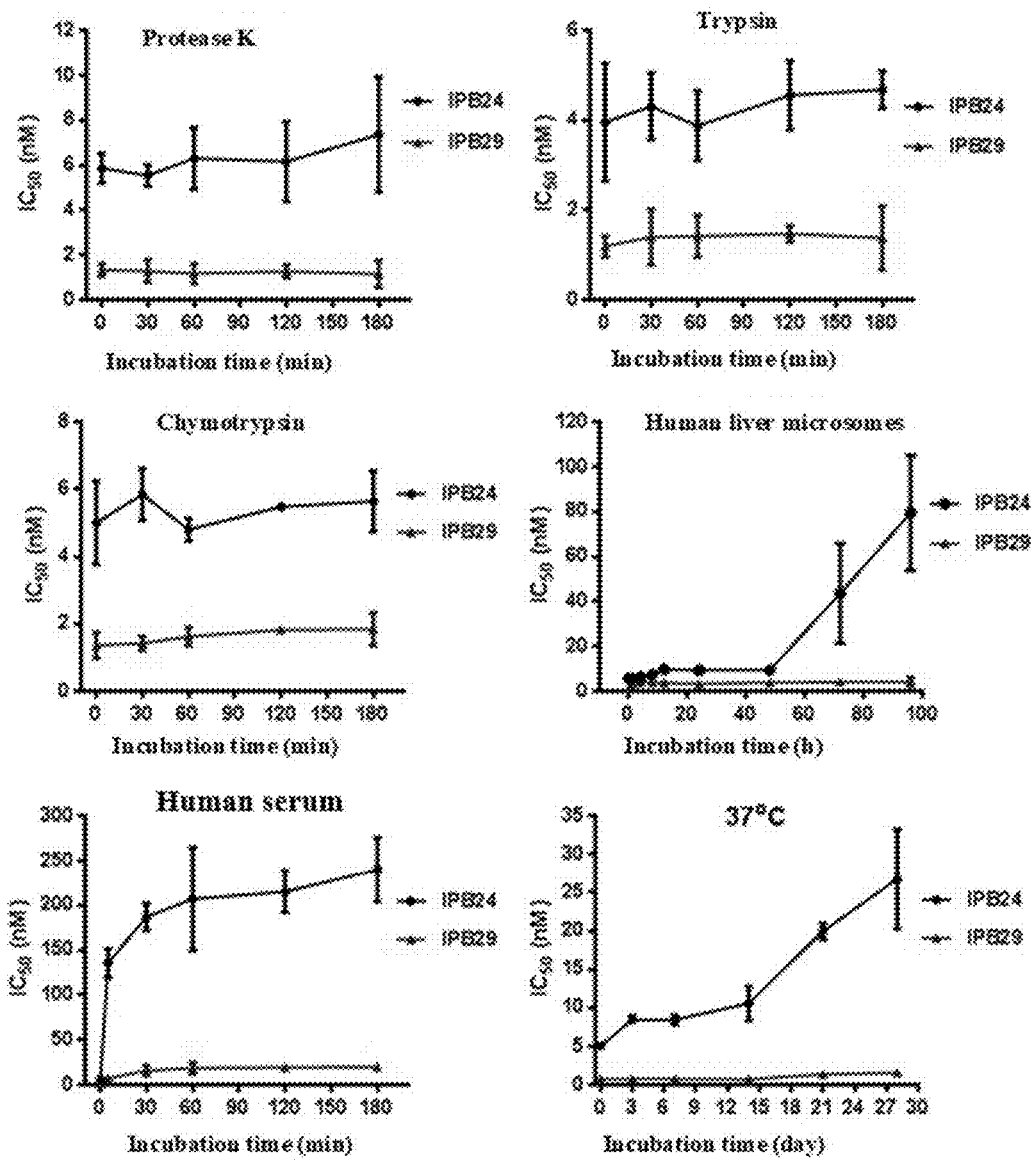
FIG. 8 shows stability analysis of lipopeptides IBP24 and IPB 29.

Experimental results were shown in FIG. 8.

Compared with untreated lipopeptides (i.e., a treatment group with incubation time of 0), the antiviral activity of IPB24 and IPB29 treated by protease K, trypsin or a-chymotrypsin had no obviously changed, indicating that single enzyme digestion had limited effect on the stability of the lipopeptides. However, after 72 and 96 hours of treatment with human liver microsomes, the inhibitory activity of IPB24 on the 293T/ACE2 cells infected with SARS-COV-2 decreased significantly, and IC$_{50}$ values increased about 8 and 14 times respectively. However, the human liver microsomes had a limited effect on the antiviral activity of IPB29. The liver microsomes contain most of phase I enzymes, where the most important is a microsome mixed functional oxidase system with CYP450 as a main component. A component affecting the activity of IPB24 needs to be further studied.

IPB24 and IPB29 were sensitive to the treatment of 20% human serum, especially the antiviral activity of IPB24 decreased about 24 times after incubation for 5 min. After incubation for 30, 60, 120, and 180 min, the antiviral activity of IPB24 decreased by about 32, 36, 37, and 42 times, respectively. In comparison, IPB29 showed significantly improved resistance to human serum. The antiviral activity decreased about 4, 10, 12, 13, and 13 times respectively at each time point from 5 to 180 min.

The antiviral activity of IPB24 after placed at 37° C. for 3, 7, 14, 21, and 28 days decreased gradually with time, especially decreased more than 5 times after 28 days. In comparison, the antiviral activity of IPB29 had no change or much smaller change under the same placement condition. The more long-term temperature stability of the lipopeptides needs to be further studied.

In conclusion, IPB29 showed an obvious stability advantage over IPB24 and had a greatly enhanced stability, which further supported that the IPB29 helix lipopeptide carrying an EAAAK (SEQ ID NO: 4) sequence had better druggability.

Example 7. Inhibitory Effect of Novel Lipopeptides on Cell-Cell Membrane Fusion Mediated by S Protein of SARS-COV-2

The to-be-tested lipopeptides: lipopeptide IPB29, lipopeptide IPB30, and lipopeptide IPB20 prepared in example 1.

Test cells: 293T/ACE2 cells and Huh-7 cells.

In order to further evaluate the anti-SARS-COV-2 activity of the novel inhibitor lipopeptides, the present disclosure performed a cell-cell fusion inhibition experiment based on a DSP system. The specific method referred to the cell-cell fusion assay in references 4 and 5. Steps were as follows: (1) A 293T effector cell suspension ($1.5 \times 10^{4/100}$ μL/well) was spread in a 96-well plate, and a 293T/ACE2 or Huh-7 target cell suspension ($1.5 \times 10^5$/mL) was spread in a 10-cm cell culture dish and cultured at 37° C. and 5% $CO_2$.

(2) After 16 hours of culture, a pCoV2-S plasmid and a pDSP1-7 plasmid were co-transfected into the 293T effector cells, a pDSP8-11 plasmid was transfected into 293T/ACE2 or Huh-7 target cells, and the cells were cultured continuously.

(3) After 24 hours, a polypeptide was diluted in a gradient of 3 times in a 96-well plate and 3 replicate wells and 9 dilution gradients were set. The diluted polypeptide was added to the effector cells and incubated in a 5% $CO_2$ cell incubator at 37° C. for 1 hour.

(4) A DMEM complete culture medium was preheated, an EnduRen living cell substrate (Promega company) was added at a ratio of 1:4,000, the 293T/ACE2 or Huh-7 target cells were resuspended and collected by centrifugation, a cell concentration was adjusted to $3\times10^5$/mL, and the cells were incubated at 37° C. and 5% $CO_2$ for 30 min.

(5) The 293T/ACE2 or Huh 7 target cells were added to the 293T effector cells in 100 μL/well, the cells were centrifuged at 400 g for 1 min to enable the effector cells to fully contact with the target cells, and then the mixed cells were cultured for 2 hours.

(6) The luciferase activity (RLU) was read in a microplate photometer and the inhibitory rates and $IC_{50}$ values were calculated.

Figure 9:
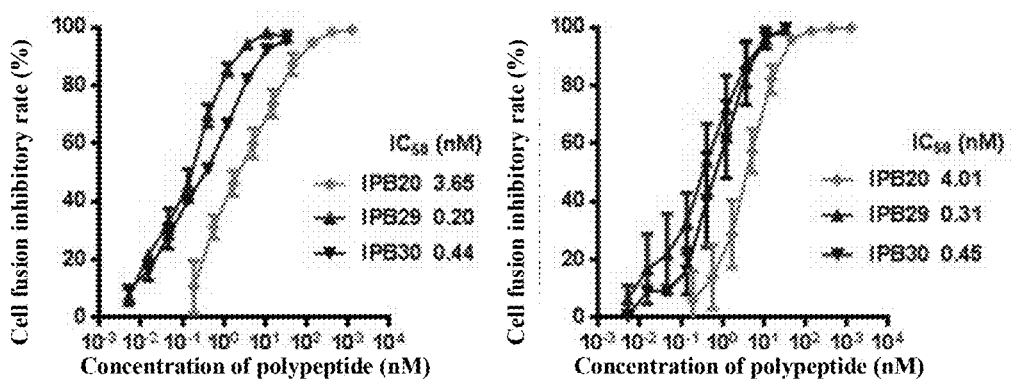
FIG. 9 shows an inhibitory effect of novel lipopeptides on cell membrane fusion mediated by an S protein of SARS-COV-2, where target cells in left figure are 293T/ACE2 cells, and target cells in right figure are Huh-7 cells.

The results were shown in FIG. 9. When the target cells were 293T/ACE2 (left), $IC_{50}$ values of IPB20, IBP29, and IBP30 in inhibiting a cell-cell membrane fusion mediated by an S protein of SARS-COV-2 were 3.65 nM, 0.2 nM, and 0.44 nM respectively. However, when the target cells were Huh-7 (right), $IC_{50}$ values of IPB20, IBP29, and IBP30 in inhibiting a cell-cell membrane fusion mediated by an S protein of SARS-COV-2 were 4.01 nM, 0.31 nM, and 0.45 nM respectively. The experimental results indicated novel membrane fusion inhibitors IPB29 and IPB30 had relatively strong inhibitory activity on cell-cell fusion mediated by an S protein of SARS-COV-2.

The present disclosure is described in detail above. A person skilled in the art can implement the present disclosure within a wide range of equivalent parameters, concentrations, and conditions without departing from the purpose and scope of the present disclosure and without unnecessary experiments. Although specific examples of the present disclosure have been given, it should be understood that the present disclosure may be further modified. In summary, according to the principle of the present disclosure, the present application is intended to encompass any change to, use of, or modification to the present disclosure, including changes, which have departed from the scope disclosed in the present application, as made by using conventional techniques known in the art. Application of some basic features can be done in accordance with the scope of the following appended claims.

A reference list is set forth in the below:
1. Xue J, Chong H, Zhu Y, Zhang J, Tong L, Lu J, Chen T, Cong Z, Wei Q, He Y.2022. Efficient treatment and pre-exposure prophylaxis in rhesus macaques by an HIV fusion-inhibitory lipopeptide. Cell 185:131-144 e18.
2. Zhu Y, Yu D, Hu Y, Wu T, Chong H, He Y.2021. SARS-COV-2-derived fusion inhibitor lipopeptides exhibit highly potent and broad-spectrum activity against divergent human coronaviruses. Signal Transduct Target Ther 6:294.
3. Yu D, Zhu Y, Yan H, Wu T, Chong H, He Y.2021. Pan-coronavirus fusion inhibitors possess potent inhibitory activity against HIV-1, HIV-2, and simian immunodeficiency virus. Emerg Microbes Infect 10:810-821.
4. Yu D, Zhu Y, Jiao T, Wu T, Xiao X, Qin B, Chong H, Lei X, Ren L, Cui S, Wang J, He Y.2021. Structure-based design and characterization of novel fusion-inhibitory lipopeptides against SARS-COV-2 and emerging variants. Emerg Microbes Infect 10:1227-1240.
5. Zhu Y, Yu D, Yan H, Chong H, He Y.2020. Design of Potent Membrane Fusion Inhibitors against SARS-COV-2, an Emerging Coronavirus with High Fusogenic Activity. J Virol 94: e00635-20.
6. Zhou J, Xu W, Liu Z, Wang C, Xia S, Lan Q, Cai Y, Su S, Pu J, Xing L, Xie Y, Lu L, Jiang S, Wang Q.2021. A highly potent and stable pan-coronavirus fusion inhibitor as a candidate prophylactic and therapeutic for COVID-19 and other coronavirus diseases. Acta Pharm Sin B doi: 10.1016/j.apsb.2021.07.026.
7. Xia S, Liu M, Wang C, Xu W, Lan Q, Feng S, Qi F, Bao L, Du L, Liu S, Qin C, Sun F, Shi Z, Zhu Y, Jiang S, Lu L.2020. Inhibition of SARS-COV-2 (previously 2019-nCOV) infection by a highly potent pan-coronavirus fusion inhibitor targeting its spike protein that harbors a high capacity to mediate membrane fusion. Cell Res 30:343-355.
8. de Vries R D, Schmitz K S, Bovier F T, Predella C, Khao J, Noack D, Haagmans B L, Herfst S, Stearns K N, Drew-Bear J, Biswas S, Rockx B, McGill G, Dorrello N V, Gellman S H, Alabi C A, de Swart R L, Moscona A, Porotto M.2021. Intranasal fusion inhibitory lipopeptide prevents direct-contact SARS-COV-2 transmission in ferrets. Science 371:1379-1382.

The invention claimed is:

1. A compound of formula (I);

$$X_1\text{—SVVNIQKEIDRLNEVAKNLNESLIDLQELGKYEQYIK—} X_2\text{—}X_3\text{—}X_5;$$
$$|$$
$$X_4$$

wherein the sequence is as shown in SEQ ID No: 3;

$X_1$ is an acetyl;

$X_2$ is EAAAK (SEQ ID No: 4);

$X_3$ is lysine having a modified side chain conjugated to $X_4$;

$X_4$ is a cholesteryl hemisuccinate;

and $X_5$ is $NH_2$;

or pharmaceutically acceptable salt, thereof.

2. A pharmaceutical composition comprising the compound of claim 1 and a pharmaceutically acceptable carrier.

* * * * *

SEQUENCE LISTING

```
<160> NUMBER OF SEQ ID NOS: 7

<210> SEQ ID NO 1
<211> LENGTH: 43
<212> TYPE: PRT
<213> ORGANISM: Artificial Sequence
<220> FEATURE:
<223> OTHER INFORMATION: synthetic peptide

<400> SEQUENCE: 1

Ser Val Val Asn Ile Gln Lys Glu Ile Asp Arg Leu Asn Glu Val Ala
1               5                   10                  15

Lys Asn Leu Asn Glu Ser Leu Ile Asp Leu Gln Glu Leu Gly Lys Tyr
            20                  25                  30

Glu Gln Tyr Ile Lys Glu Ala Ala Ala Lys Lys
        35                  40
```

<210> SEQ ID NO 2
<211> LENGTH: 43
<212> TYPE: PRT
<213> ORGANISM: Artificial Sequence
<220> FEATURE:
<223> OTHER INFORMATION: synthetic peptide

<400> SEQUENCE: 2

Ser Val Val Asn Ile Gln Lys Glu Ile Asp Arg Leu Asn Glu Val Ala
1               5                   10                  15

Lys Asn Leu Asn Glu Ser Leu Ile Asp Leu Gln Glu Leu Gly Lys Tyr
            20                  25                  30

Glu Gln Tyr Ile Lys Gly Ser Gly Ser Gly Lys
        35                  40

<210> SEQ ID NO 3
<211> LENGTH: 37
<212> TYPE: PRT
<213> ORGANISM: Artificial Sequence
<220> FEATURE:
<223> OTHER INFORMATION: synthetic peptide

<400> SEQUENCE: 3

Ser Val Val Asn Ile Gln Lys Glu Ile Asp Arg Leu Asn Glu Val Ala
1               5                   10                  15

Lys Asn Leu Asn Glu Ser Leu Ile Asp Leu Gln Glu Leu Gly Lys Tyr
            20                  25                  30

Glu Gln Tyr Ile Lys
        35

<210> SEQ ID NO 4
<211> LENGTH: 5
<212> TYPE: PRT
<213> ORGANISM: Artificial Sequence
<220> FEATURE:
<223> OTHER INFORMATION: synthetic peptide

<400> SEQUENCE: 4

Glu Ala Ala Ala Lys
1               5

<210> SEQ ID NO 5
<211> LENGTH: 5
<212> TYPE: PRT
<213> ORGANISM: Artificial Sequence
<220> FEATURE:
<223> OTHER INFORMATION: synthetic peptide

<400> SEQUENCE: 5

Gly Ser Gly Ser Gly
1               5

<210> SEQ ID NO 6
<211> LENGTH: 52
<212> TYPE: PRT
<213> ORGANISM: Artificial Sequence
<220> FEATURE:
<223> OTHER INFORMATION: synthetic peptide

<400> SEQUENCE: 6

Phe Asn Gly Ile Gly Val Thr Gln Asn Val Leu Tyr Glu Asn Gln Lys
1               5                   10                  15

Leu Ile Ala Asn Gln Phe Asn Ser Ala Ile Gly Lys Ile Gln Asp Ser

```
                  20              25              30
Leu Ser Ser Thr Ala Ser Ala Leu Gly Lys Leu Gln Asp Val Val Asn
            35              40              45

Gln Asn Ala Gln
    50

<210> SEQ ID NO 7
<211> LENGTH: 5
<212> TYPE: PRT
<213> ORGANISM: Artificial Sequence
<220> FEATURE:
<223> OTHER INFORMATION: synthetic peptide

<400> SEQUENCE: 7

Gly Gly Gly Gly Ser
1               5
```